(12) United States Patent
Hoshiya et al.

(10) Patent No.: US 6,603,643 B2
(45) Date of Patent: Aug. 5, 2003

(54) MAGNETORESISTIVE HEAD CONTAINING OXIDE LAYER

(75) Inventors: Hiroyuki Hoshiya, Odawara (JP); Kenichi Meguro, Matsuda (JP); Takao Imagawa, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/970,642

(22) Filed: Oct. 5, 2001

(65) Prior Publication Data

US 2002/0041473 A1 Apr. 11, 2002

(30) Foreign Application Priority Data

Oct. 6, 2000 (JP) ........................................ 2000-313117

(51) Int. Cl.⁷ .......................... G11B 5/127; G11B 5/33; G11B 5/39
(52) U.S. Cl. ................................. 360/324.11
(58) Field of Search ..................... 360/324.11, 324.1, 360/324, 313

(56) References Cited

U.S. PATENT DOCUMENTS

| | | | | |
|---|---|---|---|---|
| 5,768,071 | A | 6/1998 | Lin | 360/324.1 |
| 6,407,890 | B1 * | 6/2002 | Gill | 360/314 |
| 2001/0020884 | A1 * | 9/2001 | Araki et al. | 257/369 |
| 2002/0048127 | A1 * | 4/2002 | Fukuzawa et al. | 360/324.1 |

FOREIGN PATENT DOCUMENTS

| | | |
|---|---|---|
| JP | 06-111252 | 4/1994 |
| JP | 06-236527 | 8/1994 |
| JP | 07-169026 | 7/1995 |
| JP | 09-016920 | 1/1997 |
| JP | 2000-156530 | 6/2000 |

OTHER PUBLICATIONS

Sakakima, H., et al., Enhanced GMR in PtMn Based Spin–Valves with Specular Reflective Thin Oxide Layers, IEEE, Digests of Intermag 2000, p. FA–08.
Shimizu, Y., et al., Enhancement of GMR Properties of Bottom Type Spin Valve Films with Ultra–thin Free Layer Covered with Specular Oxide Capping Layer, IEEE, Digest of Intermag 2000, p. FA–07.
Hong, J., et al., Control of Inter–Layer Coupling Field in Spin Valves by Thin Oxide Layer, IEEE, Digests of Intermag 2000, p. BQ–12.
Tsuchiya, Y., et al., RuRuMn and PtMn Specular Spin Valve with Magentic Oxide Layer, IEEE, Digests of Intermag 2000, p. FA–09.
Kamiguchi, Y., et al., CoFe Specular Spin Valves with a Nano Oxide Layer, IEEE, Digests of Intermag 2000, p. DB–01.
The Society of Japan Applied Magnetism, Summary of Proceedings of 23rd Conference, 6aA–6, 1999, p. 188.
Swagten, H.J.M., et al., Enhanced Giant Magnetoresistance in Spin–Valves Sandwiched between Insulating NiO, Physical Review B53, 1996, pp. 9108–9114.
Egelhoff, W.F., Jr., et al., Optimizing the Giant Magnetoresistance of Symmetric and Bottom Spin Valves (Invited), Journal of Applied Physics, 79 (8) 1996, pp. 5277–5281.

* cited by examiner

*Primary Examiner*—Brian E. Miller
*Assistant Examiner*—Julie Anne Watko
(74) *Attorney, Agent, or Firm*—Mattingly, Stanger & Malur, P.C.

(57) ABSTRACT

An oxide layer and an antiparallel coupling layer are inserted into a ferromagnetic pinned layer to be subjected to heat treatment with appropriate ferromagnetic film thickness and magnetization field to form a spin-valve film, which is controlled in amount of magnetization and is high in magnetoresistance.

4 Claims, 20 Drawing Sheets

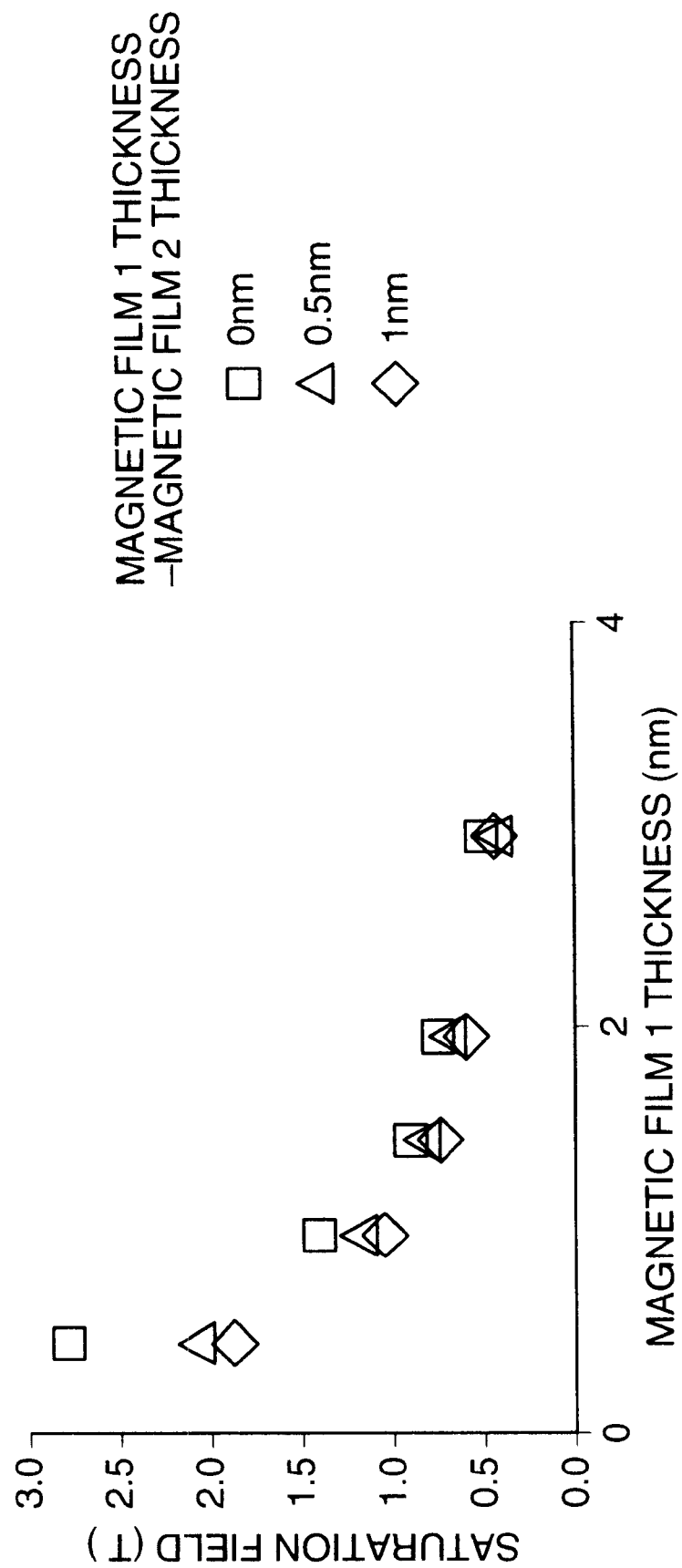

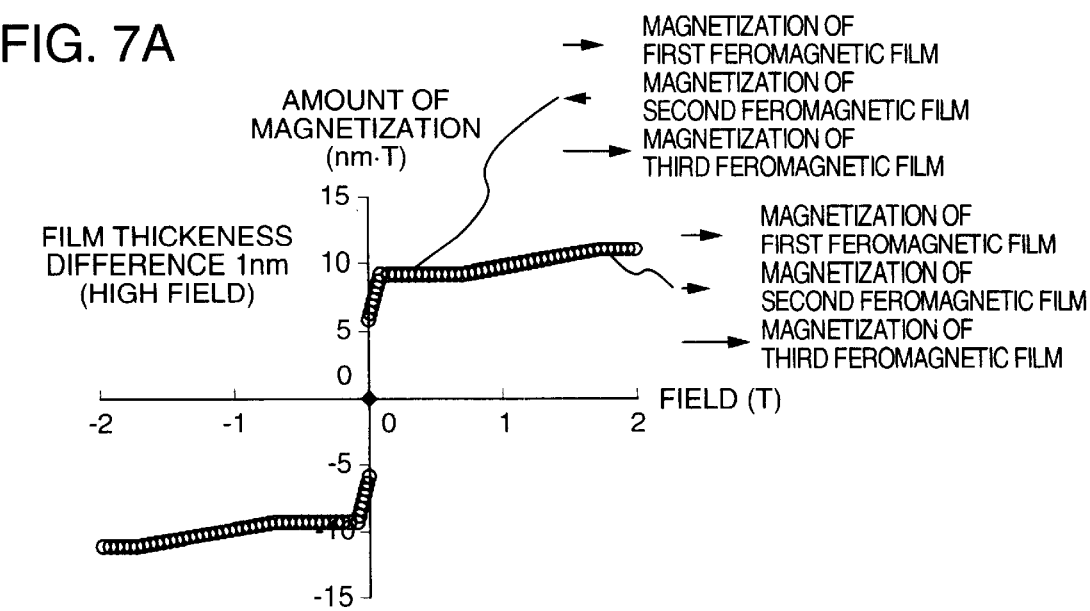
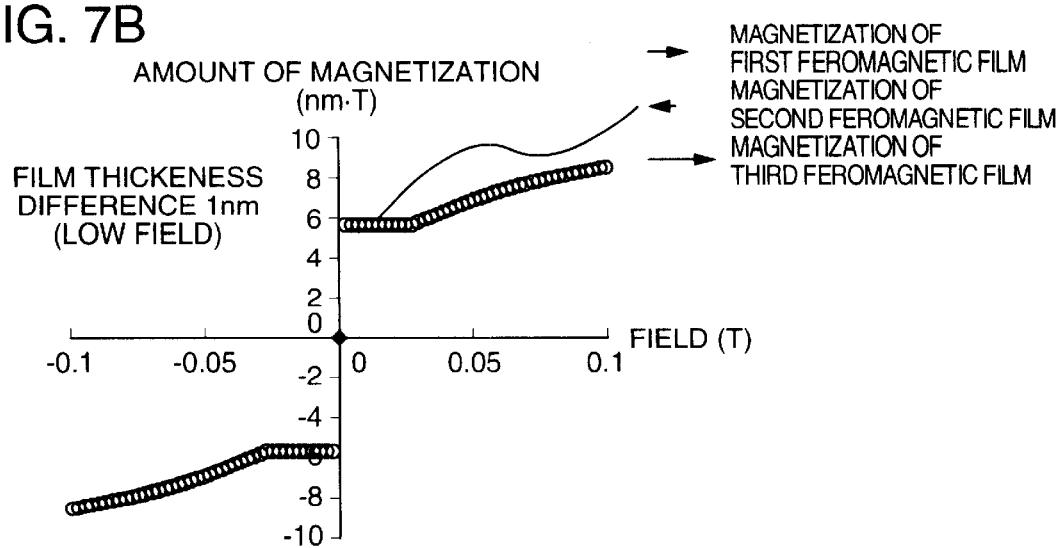
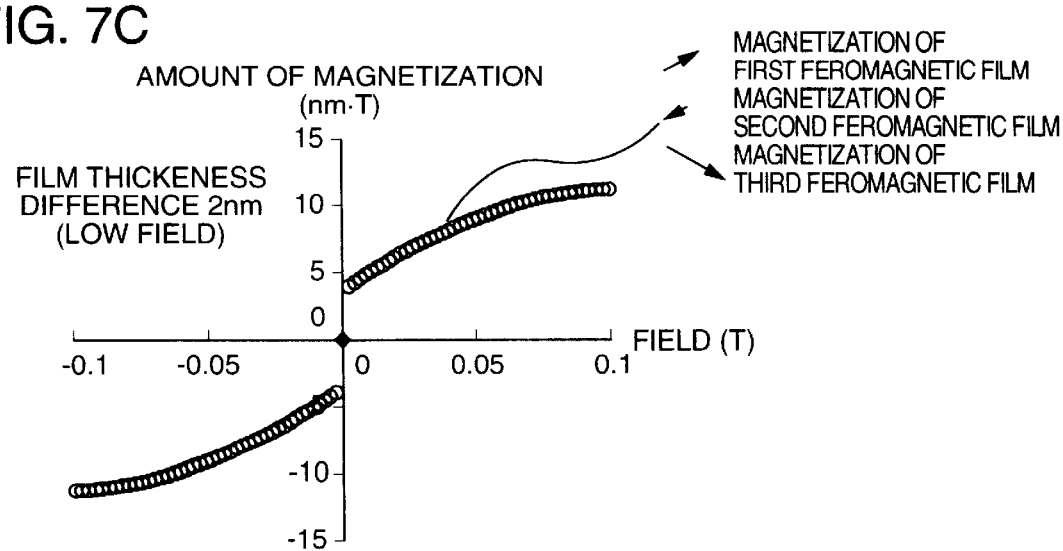

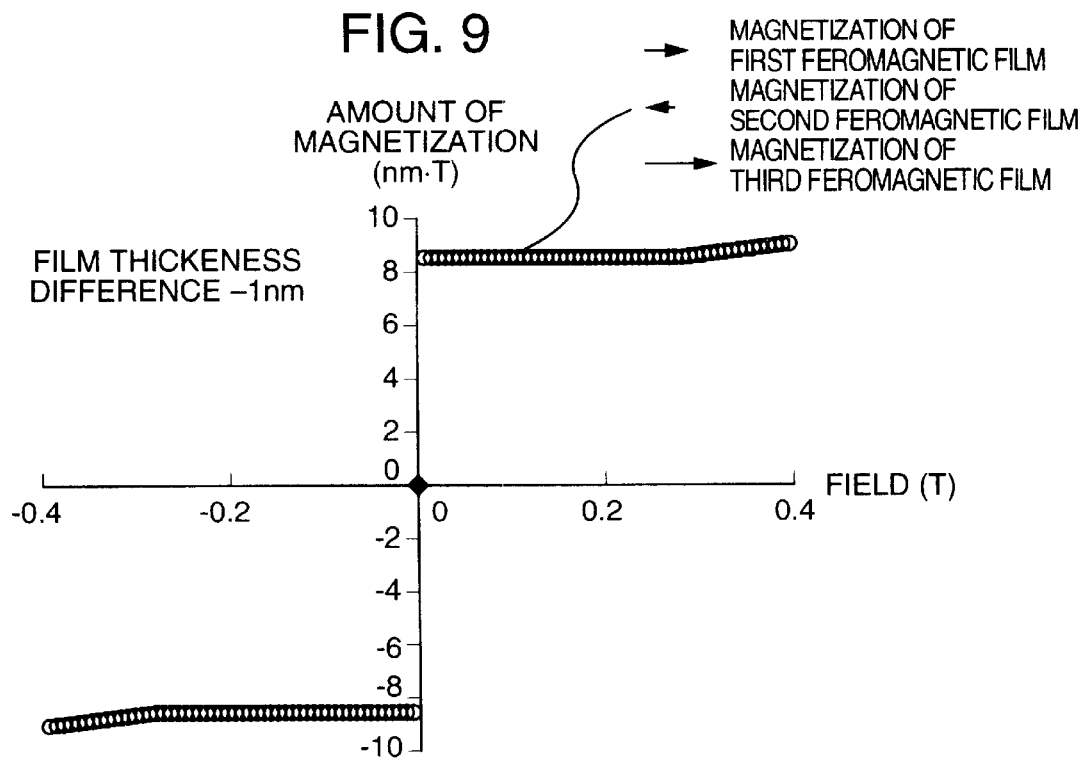
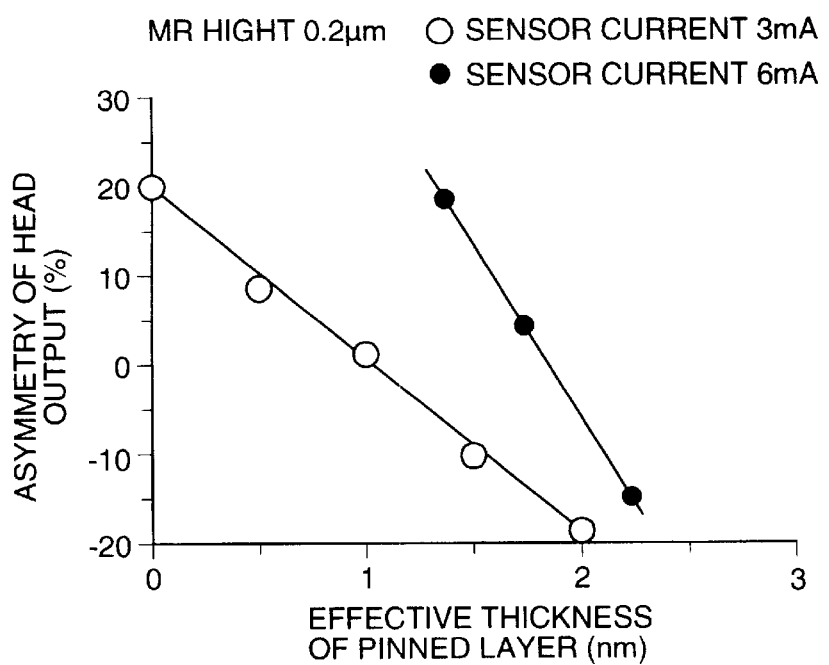

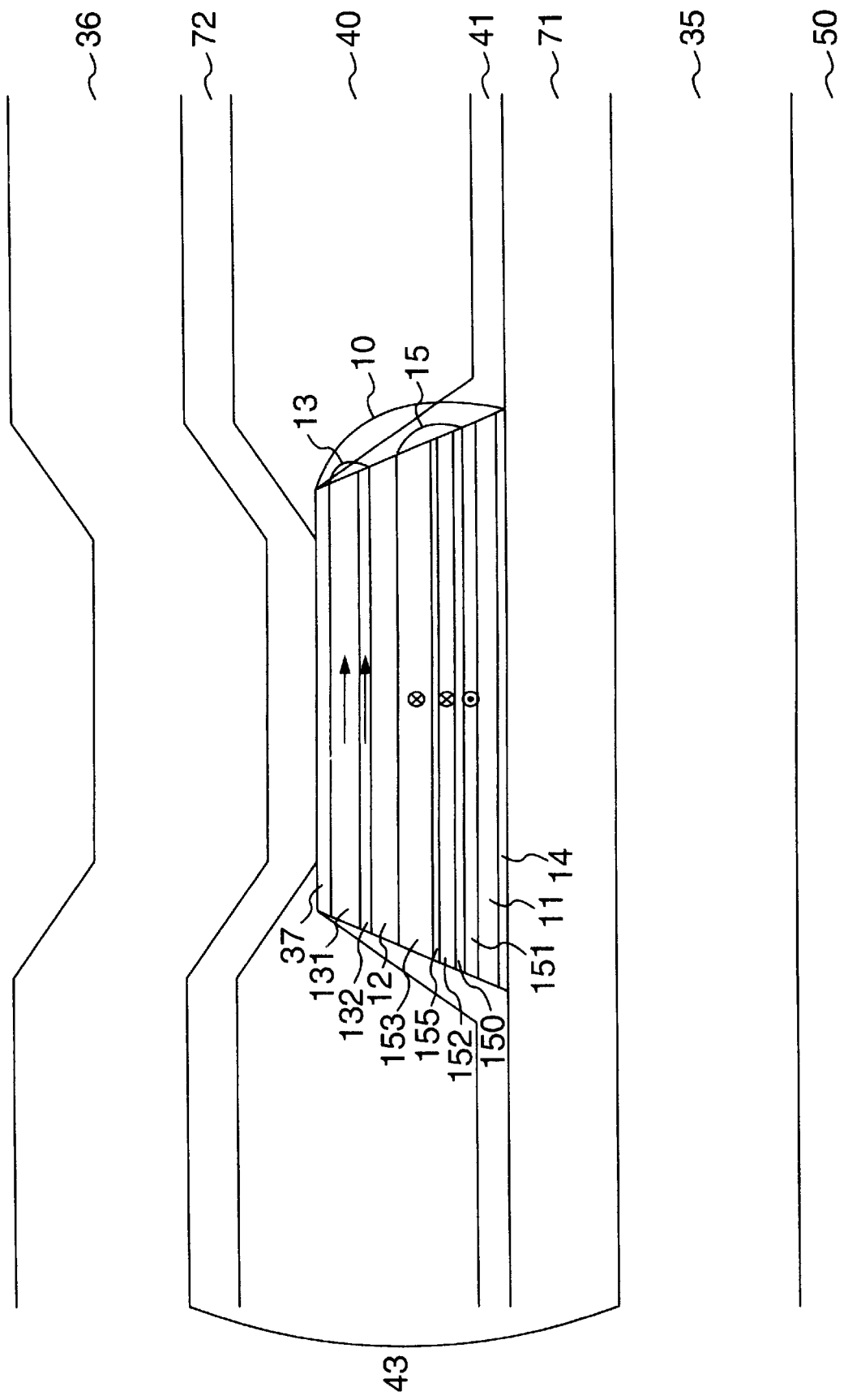

MAGNETORESISTIVE HEAD CONTAINING OXIDE LAYER

BACKGROUND OF THE INVENTION

The present invention relates to a magnetic recording/reproducing apparatus and a magnetoresistive element, and more particularly to a high-density magnetic recording/reproducing apparatus and a method of manufacturing the same.

JP-A-9-16920 describes a spin-valve magnetoresistive sensor using a laminated antiparallel pinned layer and an antiferromagnetic exchange bias layer.

JP-A-7-169026 describes a spin-valve sensor using an antiferromagnetic coupling layer.

JP-A-6-236527 describes a magnetoresistive sensor having a conductive back layer at the back of a filter layer responsive to a magnetic field.

JP-A-6-111252 describes a magnetoresistive sensor having a soft-magnetic intermediate layer adhered between an antiferromagnetic layer and a ferromagnetic layer.

U.S. Pat. No. 5,768,071 describes a spin-valve type read head, in which exchange coupling is improved by inserting a thin, non-contiguous nonmagnetic layer of, for example, Cu between an antiferromagnetic film and a ferromagnetic film.

JP-A-2000-156530 describes a magnetoresistive element including a third layer of, e.g., oxide in a second magnetic layer with magnetization substantially fixed. Further, the Society of Japan Applied Magnetism, Summary Proceedings of 23rd Conference 6aA-5, describes a spin-valve film having a magnetization fixed layer containing a nano oxide layer.

Digests of Intermag 2000, FA-08, describes a giant magnetoresistance (GMR) film making use of a thin oxide. FA-07 of the same literature describes a GMR film having a protective oxide film laminated on a free layer. BQ-12 of the same literature also describes a GMR film having a protective oxide film laminated on a free layer. FA-09 of the same literature describes a spin-valve film using a magnetic oxide layer.

Digests of Intermag 1999, DB-01, describes a spin-valve film making use of a pinned layer having an oxide layer inserted therein.

Physical Review B53, 9108 (1996) and Journal of Applied Physics, 79, 5277 (1990) describe that the giant magnetoresistance is enhanced by an effect of an interface with an oxide.

In the prior art, it has been impossible to realize a magnetic recording apparatus with a sufficiently high recording density, in particular, magnetoresistive elements in a read unit of the apparatus, which act on the external magnetic field with adequate sensitivity and output, and further to obtain a favorable performance with good symmetry, so that it has been difficult to realize the function as a storage device.

In recent years, it has been known that a multi-layer film having ferromagnetic metal layers laminated with nonmagnetic metal layers therebetween is great in magnetoresistance, or a so-called giant magnetoresistance. In this case, the magnetoresistance is varied in electric resistance in accordance with an angle formed by magnetizations of the ferromagnetic layers separated from one another by the nonmagnetic layers. In the case of using the giant magnetoresistance for magnetoresistive elements, a structure called a spin valve has been proposed. More specifically, output can be obtained by providing a structure of antiferromagnetic film/ferromagnetic layer/nonmagnetic layer/soft-magnetic layer, using an exchange coupling magnetic field generated at the interface of antiferromagnetic film/ferromagnetic layer to substantially pin magnetization of the ferromagnetic layers in close contact with the antiferromagnetic films, and causing an external magnetic field to perform magnetizing rotation of the other soft-magnetic layer. The effect of the above pinning is called a pinning bias, and the antiferromagnetic film producing such effect is called a pinning bias film. Also, that ferromagnetic layer, for which the magnetization is substantially pinned, is called a pinned layer or a ferromagnetic pinned layer. Similarly, a soft-magnetic film caused by an external field to undergo rotation of magnetization is called a free layer or a soft-magnetic free layer. The pinned layer functions to be substantially pinned in magnetization relative to a magnetic field being sensed, and the antiferromagnetic film can be replaced by a hard magnetic film, that is, a material, for which magnetization will not change except for application of a relatively large magnetic field.

With a magnetic head using the spin-valve type magnetoresistive laminated film, important factors include a thickness of the pinned layer and an amount of its magnetization. That is, this is because with a magnetic head having opposite surfaces exposed, a magnetic field leaks from ends of pinned layers in accordance with an amount of magnetization of pinned layers, i.e., a product of magnetization and thickness as one of factors of symmetry in waveform of a read head relative to an external field to have an influence on a direction of magnetization of free layers. In keeping with an increased recording density of magnetic recording/reproducing apparatuses in recent years, spin-valve sensors serving as read elements have been increasingly made small in size and leakage of the magnetic field from ends of pinned layers has produced large influences. To cope with this, it is necessary to reduce an amount of magnetization of pinned layers, i.e., reduce pinned layers in thickness or magnetic flux density. Simply thinning of pinned layers in a spin-valve laminated film, however, magnifies the effect of surface scattering to cause reduction in MR ratio, which will in turn impair the performance of a read sensor. Similarly, when the pinned layers of a spin-valve laminated film are modified in composition so as to be reduced in magnetic flux density, the giant magnetoresistance is impaired to cause reduction in MR ratio, which will also impair the performance of a read sensor. These problems are also observed with the free layer. JP-A-6-236527 proposes a construction, in which a conductive layer is provided behind a free layer called a filter layer to suppress reduction in MR ratio due to the surface scattering effect. Also, Physical Review and Journal of Applied Physics have pointed out that the effect of oxide causes an improvement in giant magnetoresistance. Further, the summary proceedings of conference of the Society of Japan Applied Magnetism has reported that a spin-valve film with oxide layers formed in pinned layers is high in MR ratio.

When an oxide and an antiparallel coupling layer are inserted in a pinned layer so as to apply a spin-valve type magnetoresistive laminated film to a magnetic head, in particular to a magnetic head for magnetic recording/reproducing apparatuses of high recording density, however, it is easily expected that a pinned layer will be of complex construction consisting of at least three of the magnetic films and oxide films and further five or more layers consisting of antiparallel coupling layers laminated. Such complex structure of a pinned layer can be an obstacle to attaining the function of a magnetoresistive element and makes it difficult to induce and produce a pinning bias essential for the operation of a spin-valve structure. For the magnetic head to function, a pinning bias is applied in a predetermined direction as described above. That is, a pinning bias is applied in a predetermined direction described above upon functioning as a magnetic head. A method of manufacturing a magnetic head comprises applying a magnetic field to a magnetoresistive film and performing heat treatment in a state, in which magnetization of a magnetic film in contact with an antiferromagnetic film is saturated in a predetermined direction described above, to apply a pinning bias. However, since the pinned layer is of complex structure and contains therein an antiparallel coupling layer having the property of firmly maintaining the magnetized state of an adjacent magnetic film in an antiparallel direction, a necessary performance cannot be obtained even when a magnetoresistive element is formed only by combining conventional techniques.

BRIEF SUMMARY OF THE INVENTION

It is therefore an object of the present invention to provide a magnetic recording apparatus or a magnetic head using a magnetic sensor with a long-term reliability conformed to high-density recording. More specifically, an object of the present invention is to provide a spin-valve type magnetic sensor, of which amount of magnetization is reduced by inserting a thin oxide layer and an antiparallel coupling layer into a pinned layer using a bias application means such as an antiferromagnetic film partly and which is high in MR ratio, a construction, in which a pinning bias is correctly applied in a predetermined direction, a method of manufacturing the same, and a magnetic recording/reproducing apparatus, in which the construction is applied in a magnetic head.

To provide a magnetic recording apparatus, in which a magnetic sensor using a giant magnetoresistance conformed to high-density recording is mounted on a magnetic head, the present invention uses as the magnetic sensor a spin-valve type giant magnetoresistive laminated film, i.e., a magnetoresistive element of multilayer structure comprising an antiferromagnetic film/a ferromagnetic pinned layer/a nonmagnetic conductive layer/a soft-magnetic free layer. Here, the antiferromagnetic film serves to apply an exchange coupling bias for substantially pining the magnetization of the ferromagnetic pinned layer and may either be formed in direct contact with the ferromagnetic pinned layer or produce the similar effect indirectly through a magnetic coupling. Instead of the antiferromagnetic film, other bias application means such as the remanent magnetization of a hard magnetic film and a current bias may be used. To solve the above problems and to provide a magnetic recording/reproducing apparatus mounting thereon a magnetic head and a magnetic sensor which are conformed to high recording density, the present invention employs a structure in which the ferromagnetic pinned layer is formed as a laminate consisting of a first ferromagnetic film/an antiparallel coupling layer/a second ferromagnetic film/an oxide layer/a third ferromagnetic film. Here, the first ferromagnetic film making up the pinned layer contacts with the antiferromagnetic film and the third ferromagnetic film contacts with the nonmagnetic conductive layer. The antiparallel coupling layer is formed from a material of a thickness which antiferromagnetically couple the adjoining ferromagnetic films so that their magnetizations are oriented antiparallel to one another. Also, the oxide layer is formed from a material of a thickness which the adjoining second and third ferromagnetic films ferromagnetically couple so that their magnetizations are oriented parallel to a magnetic field to be sensed (i.e., the field from the magnetic recording medium). The oxide layer further forms smooth interfaces between them and the adjoining ferromagnetic films and functions to amplify a magnetic scattering phenomenon generated near the nonmagnetic conductive layer. To provide for magnetization of the ferromagnetic pinned layer of this multilayer structure in a predetermined state, an appropriate magnetic field is applied to saturate the first and second ferromagnetic films. The appropriate magnetic field means a field determined by the exchange coupling energy generated by the antiparallel coupling layer, the amount of magnetization of the first ferromagnetic film and the amount of magnetization of the second ferromagnetic film. This appropriate magnetic field functions to orient in a predetermined direction the magnetization direction of the first ferromagnetic film that should be substantially pinned by the exchange coupling field of the antiferromagnetic film. In this magnetic field, heat treatment for conducting the exchange coupling field from the antiferromagnetic film in a predetermined direction is carried out in a vacuum or in an inert gas.

In the above structure, there are two ways to conduct the magnetization direction of the first ferromagnetic film in a predetermined direction. One is to apply a sufficiently large magnetic field to saturate the first and second ferromagnetic films. In this case, the necessary magnetic field is represented as follows.

$$Hs = -\mu_0 \cdot J \times (M1 \cdot t1 + M2 \cdot t2)/(M1 \cdot M2 \cdot t1 \cdot t2)$$

When the first and second ferromagnetic films have the same saturation flux density M, $$Hs = -\mu_0 \cdot J \times (t1 + t2)/(t1 \cdot t2)/M$$

Here, Hs is a saturation field, J is an exchange coupling energy induced by the antiparallel coupling layer, M1 and M2 are saturation flux densities of the first and second ferromagnetic films, and t1 and t2 are thicknesses of the first and second ferromagnetic films. Typical structure and values are as follows. A Ru antiparallel coupling layer has a thickness of 0.8 nm; and when the first and second ferromagnetic films are made of Co alloy, $J=-1.0\times10^{-3}$ J/m$^2$, and M1=M2=M=1.8 T. Hence, when $t1=2\times10^{-9}$ m and $t2=1\times10^{-9}$ m, then Hs is about 1.0 T. For simplicity, the magnetic field is represented in a spatial flux density and in unit of tesla. It is seen from the above that it is necessary to apply a field of 1.0 T or higher for the magnetizing process of the magnetoresistive laminated film of the structure described above. Similarly, when $t1=1\times10^{-9}$ m and $t2=0.5\times10^{-9}$ m, Hs reaches as high as 1.8 T, which requires a magnetization heat treatment mechanism for generating a larger field than normally used, e.g., an in-field heat treatment system using a superconductive magnet. Further, in the magnetic head, the magnetoresistive laminated film is generally installed in a gap between a pair of soft-magnetic films called magnetic shields, so a substantial external field for effectively applying a field to the magnetoresistive laminated film should be in some cases considered to be substantially 1.5 times larger.

Subsequently, an explanation will be given to a way to apply a relatively weak field as a second way to conduct the magnetization directions of the ferromagnetic films in a predetermined direction. When a weak field of about several tens of mT is applied, the magnetization directions of the first and second ferromagnetic films turn while kept in their antiparallel state relative to each other, to be aligned so that a difference between the magnetizations is directed in the direction of the field. Therefore, the magnetization direction of the first ferromagnetic film can be specified for magnetization heat treatment by setting a film thickness difference between the first and second ferromagnetic films so as to produce a difference between amounts of their magnetizations, and applying a magnetic field which is sufficiently small relative to the antiferromagnetic coupling field of the antiparallel coupling layer and large enough to cause a magnetization difference between amounts of magnetizations of the first and second ferromagnetic films to align in the direction of field. A specific, appropriate magnitude of the field is of course determined by the saturation flux density of the magnetic films, settings of film thickness and the magnitude of the exchange coupling energy of the antiparallel coupling layer, but may be preferably in the range from about 0.01 T to 0.1 T.

Also, according to this invention, as another means for solving the problem described above, the ferromagnetic pinned layer is formed to be a laminate consisting of a first ferromagnetic film/a magnetization field control layer/a second ferromagnetic film/an antiparallel coupling layer/a third ferromagnetic film. The first ferromagnetic film making up the ferromagnetic pinned layer contact with an antiferromagnetic film, and the third ferromagnetic film contacts with a nonmagnetic conductive layer. As another means, the ferromagnetic pinned layer is formed to be a laminate consisting of a first ferromagnetic film/a magnetization field control layer/a second ferromagnetic film/an antiparallel coupling layer/a third ferromagnetic film/an oxide layer/a fourth ferromagnetic film. The first ferromagnetic film making up the ferromagnetic pinned layer contacts with an antiferromagnetic film, and the fourth ferromagnetic film contacts with a nonmagnetic conductive layer. The antiparallel coupling layer is formed from a material of a thickness such that the adjoining ferromagnetic films antiferromagnetically couple with the antiparallel coupling layer therebetween so as to have their magnetizations oriented antiparallel to each other. Also, the oxide layer is formed from a material of a thickness such that the adjoining ferromagnetic films ferromagnetically couple so as to have their magnetizations oriented parallel to a magnetic field to be sensed. The oxide layer further forms smooth interfaces between it and the adjoining ferromagnetic films and functions to amplify a magnetic scattering phenomenon generated near the nonmagnetic conductive layer. Further, the magnetization field control layer generates a ferromagnetic coupling in such a manner to have the magnetizations of the adjoining ferromagnetic films oriented parallel to each other. The magnitude of this ferromagnetic coupling is set relatively weak as compared with the coupling of the antiparallel coupling layer. Thereby, the magnetization of the first ferromagnetic film formed between the magnetization field control layer and the antiferromagnetic film can be saturated with a relatively weak field, i.e., a field sufficiently weak as compared with that required to saturate the magnetization of the ferromagnetic film adjoining the antiparallel coupling layer. In this case, the field required for the magnetization heat treatment is about 0.1 T to 1 T.

By determining various structures and magnetization means as described above, it is possible to realize a structure, in which the ferromagnetic film/oxide layer interface are formed in the ferromagnetic pinned layer to enhance the electron spin-dependent scattering effect, the magnetic film making up the pinned layer is properly prescribed in a substantial amount of magnetization and the exchange coupling field is applied to the magnetic films in the adjoining pinned layers of the antiferromagnetic film in a predetermined direction without dispersion to effectively pick up a magnetic field to be sensed, as a resistance change.

To amplify the giant magnetoresistance, materials similar to a ferromagnetic material forming the pinned layer and free layer, i.e., oxides of Co, Fe and Ni or a mixture of these oxides are suitable as materials of the oxide layer. $Fe_3O_4$ (magnetite) and CoFeO are particularly suited. While the oxide layer may be formed by oxidizing a magnetic film, the composition, thickness and structure of the oxide layer can be well controlled when it is formed by sputtering using an oxide target.

Ru, Os, Ir, Re and Rh, and alloys of these are suitable as materials of the antiparallel coupling layer. Further, other appropriate elements may advantageously be added for adjusting the exchange coupling energy of antiparallel coupling. Preferably, Pt, Cu, Au, Ag, Pd, Ni, Co and Fe are added in about 1 atomic % or more and 50 atomic % or less.

Non-ferromagnetic metals such as Cu, Ru, Pd and Cr, alloys thereof and oxides of 3d transition elements are preferable as materials of the magnetization field control layer. In particular, the use of oxides is advantageous as shunt currents are reduced. It is also preferable to use oxides having a crystallinity improvement effect and an electron reflection effect, which intensify the giant magnetoresistance.

In this invention, the ferromagnetic pinned layer and the soft-magnetic free layer are desirably made from alloys of Ni, Fe and Co or may be a laminated film of these alloys. The soft-magnetic free layer is desirably composed of a laminated film of Ni80Fe20 (3 nm)/Co90Fe10 (0.5 nm) with a CoFe arranged on the side of the nonmagnetic intermediate layer to gain a soft magnetism characteristic and increase in the giant magnetoresistance. Alternatively, a Co85Fe15 alloy thin film having a thickness of about 2 nm may be used for the soft-magnetic free layer, and further a Co alloy thin film with an appropriate oxide film inserted therein may be used therefor.

According to the present invention, it is possible to realize a high-density recording, i.e., one having a short recording wavelength recorded in a recording medium and recording tracks of narrow width for a sufficient read output and favorable recording with a magnetoresistive sensor using these materials and structures and a magnetic recording/reproducing apparatus whose read part is manufactured by subjecting the sensor to an in-field heat treatment that induces anisotropy in a predetermined direction.

BRIEF DESCRIPTION OF THE SEVERAL VIEWS OF THE DRAWING

FIG. 2 is a diagram showing the relationship between a thickness of a magnetic film coupled by an antiparallel coupling layer and saturation field.

FIGS. 7A to 7C illustrates magnetization curves, resulted from calculation, of a giant magnetoresistive laminated film of this invention before magnetization.

FIG. 9 illustrates magnetization curves, resulted from calculation, of a giant magnetoresistive laminated film of this invention before magnetization, with an effective difference of a pinned layer being fixed to 1 nm·T.

FIG. 10 is a diagram showing the relationship between a magnetization amount of a pinned layer and a wave symmetry of a magnetic head output in a high-density magnetic recording.

FIG. 24 illustrates an exemplary construction of a giant magnetoresistive head using a giant magnetoresistive laminated film of the invention.

DETAILED DESCRIPTION OF THE INVENTION

Thin films making up a giant magnetoresistive laminated film of the present invention were manufactured in the following manner by means of a radio frequency (rf) magnetron sputtering system. In an argon atmosphere of 0.5–6 mTorr the following materials were successively laminated on a ceramic substrate having a thickness of 1 mm. Sputtering targets used were those of tantalum, nickel-20 at. % iron alloy, copper, cobalt, MnPt, ruthenium, magnetite, hematite, cobalt oxide, and nickel oxide. One centimeter square chips of Fe and Ni were placed appropriately on a Co target for adjustment of composition. In the same manner, chips of Fe, Ni, Co and Mn were placed on oxide targets for adjustment of composition. A laminated film was formed by applying an rf power to cathodes, respectively, with respective targets mounted thereon, to generate plasma in the system and then by opening and closing shutter arranged for respective cathodes to successively form respective layers. Oxide layers were formed in two ways, one being the film formation using the above-mentioned oxide targets and the other comprising forming a magnetic film, exposing the film to a predetermined oxygen atmosphere for a predetermined time in a separate chamber, and then performing film deposition. After the film formation, a permanent magnet was used to apply a magnetic field of about 80 oersted (Oe) parallel to a substrate to provide for one-axis anisotropy. The film thus formed was heat-treated at 270° C. for three hours in a vacuum and in a magnetic field to cause a phase transformation of an antiferromagnetic film, and was cooled down to below 100° C. in the magnetic field to be taken out for measurement and evaluation with respect to room temperature magnetoresistance. The magnetic field applied was in the range from 0.01 T to 1.5 T and adjusted according to the structure of the laminated film. A magnetoresistive element on the substrate was patterned by the photoresist procedure. Then, the substrate was subjected to slider processing and loaded on a magnetic recording apparatus.

Embodiments of the present invention will be described with reference to the drawings.

Figure 1A:
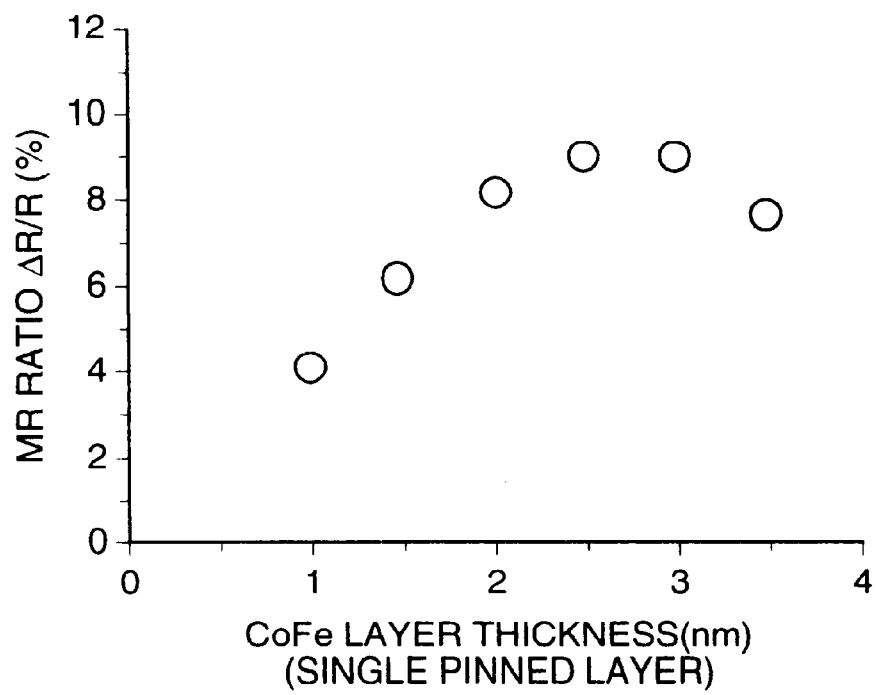
FIGS. 1A and 1B illustrate the property of a spin-valve film having a single pinned layer.
Figure 1B:
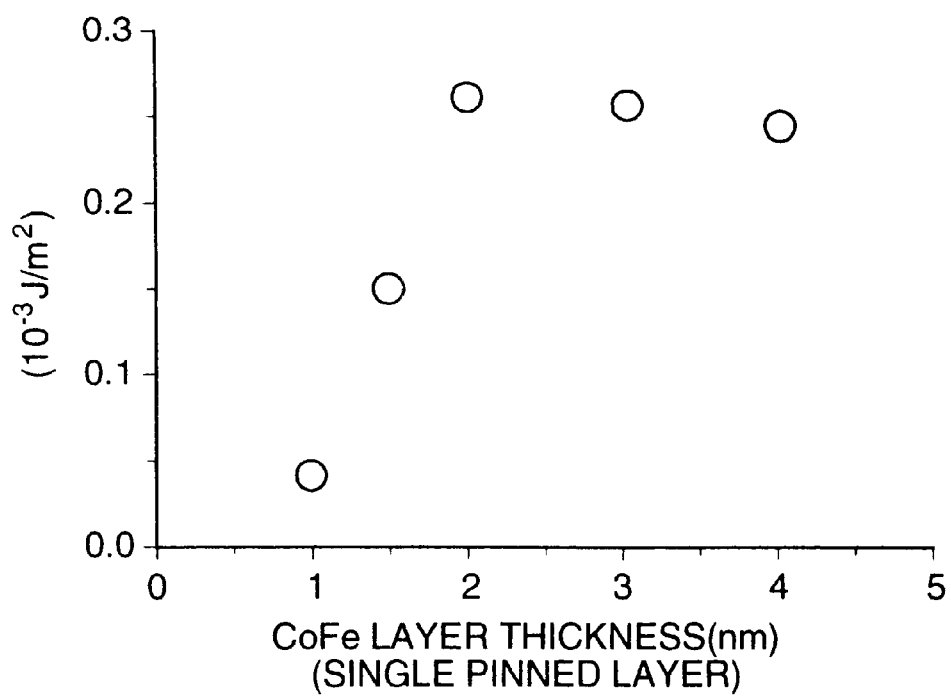

First, to explain the structure of a giant magnetoresistive laminated film of this invention, evaluation results of properties of respective elements of the structure will be explained with reference to FIGS. 1A and 1B and FIG. 2.

FIG. 1 is a view showing the property of a spin-valve film having a single pinned layer. It is seen from the figure that there are two limitations on the thickness of the pinned layer. One of them is an exchange coupling energy for an antiferromagnetic film. When the pinned layer in contact with the antiferromagnetic film is smaller in thickness than 2 nm, the exchange coupling energy sharply decreases as shown in FIG. 1. In a structure with the pinned layer being smaller in thickness than 1.5 nm, a pinning bias sufficient to function as a spin-valve film cannot be obtained. Secondly, there is a decrease in MR ratio.

It is seen that when the pinned layer becomes smaller in thickness than 2 nm, it decreases in MR ratio and when the layer becomes larger in thickness than 3 nm, a decrease in MR ratio begins and at the same time the film decreases in sheet resistance, resulting in reduction in ΔR, that is, a measure of output, which is the product of sheet resistance and MR ratio. This means that in the giant magnetoresistive laminated film of this invention, there are limitations on the thickness of a magnetic film in contact with an antiferromagnetic film and on the thickness of a magnetic film in contact with a nonmagnetic conductive layer, respectively. In the case where, for example, the giant magnetoresistive laminated film of this invention comprises a structure consisting of an antiferromagnetic film/a first ferromagnetic film/an antiparallel coupling layer/a second ferromagnetic film/an oxide layer/a third ferromagnetic film/a nonmagnetic intermediate layer/a soft-magnetic free layer, it is understood that for normal operation of the giant magnetoresistive laminated film, the first ferromagnetic film in contact with the antiferromagnetic film needs to have a thickness of 1.5 nm or more and the third ferromagnetic film in contact with the nonmagnetic intermediate layer needs to have a thickness of between 1 nm and 3 nm.

A magnetic field required for saturation of a magnetic film will be explained. FIG. 2 is a view showing a relationship between the thickness of a magnetic film coupled with an antiparallel coupling layer and a saturation field. Calculation is made on the assumption that an antiferromagnetic exchange coupling energy of the antiparallel coupling layer is $-1$ mJ/m$^2$.

Results are shown for the case where a difference in thickness between the antiferromagnetically coupled magnetic film 1 and magnetic film 2 is 0 nm, 0.5 nm and 1 nm, and it is found that the smaller the thickness of the magnetic film, the greater the saturation field. When the thickness of the magnetic film 1 is equal to or less than 1 nm, the saturation field is 1 T or more, and it is understood that taking account of reduction in the applied field due to magnetic shield, the magnetic field required for magnetization will become as large as 1 to 1.5 T. Generally, a large-scale, expensive equipment for magnetization and heat treatment is needed to apply a magnetic field greater than 1 T for magnetization and heat treatment, and thus it is important in terms of manufacture to make appropriate a value of magnitude of a required magnetic field and the structure of a laminated film conformed thereto.

Figure 3:
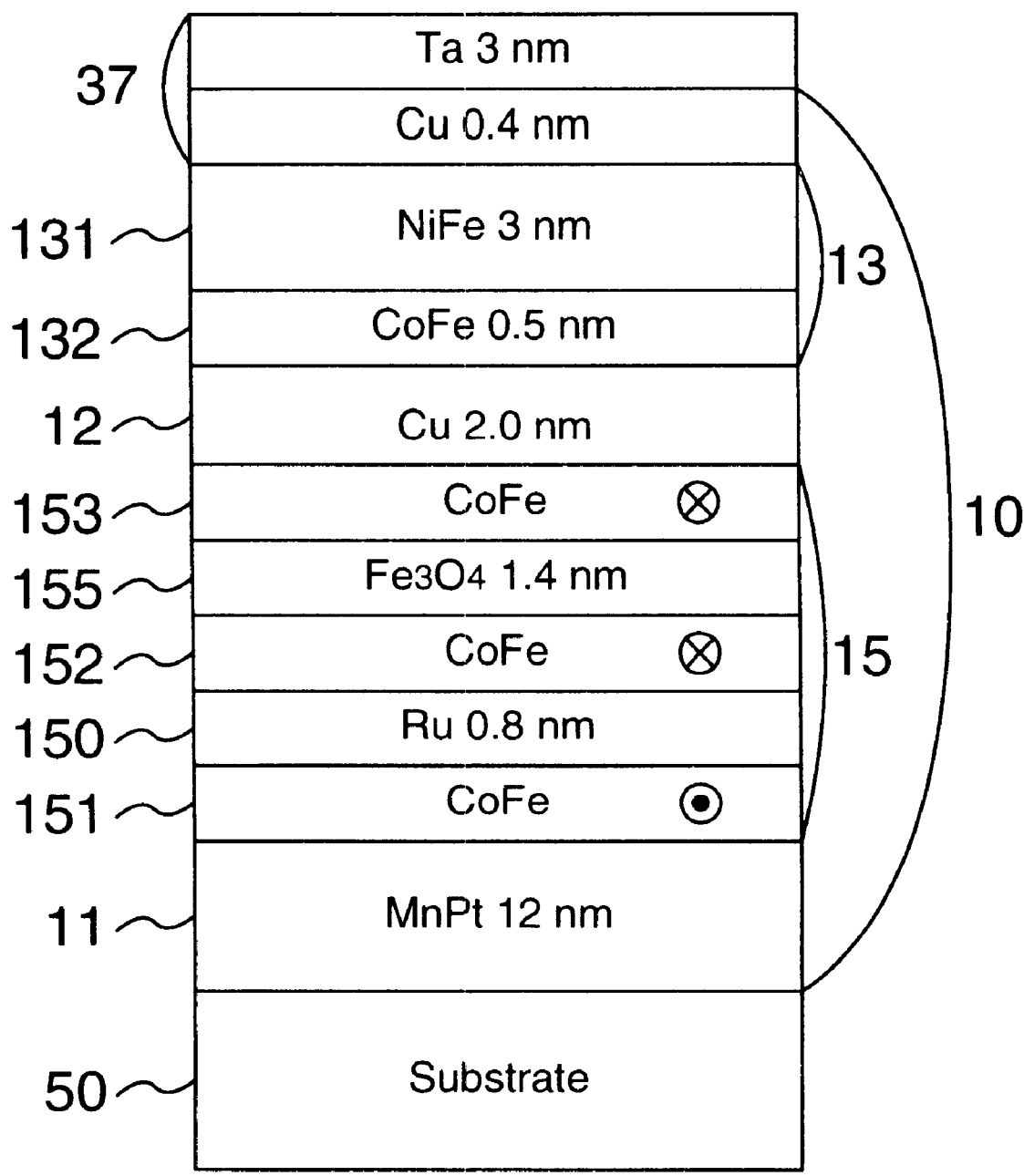
FIG. 3 illustrates an exemplary construction of a giant magnetoresistive laminated film in the present invention.
Figure 4:
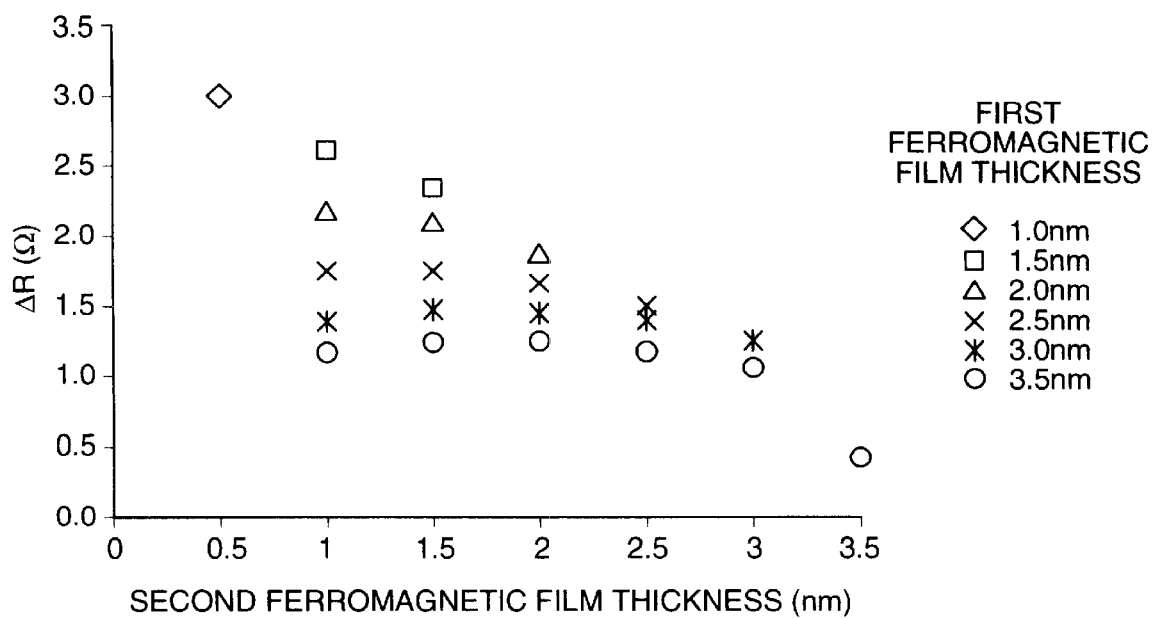
FIG. 4 is a diagram showing the relationship between the film thickness of a giant magnetoresistive laminated film of the present invention and ΔR.
Figure 5:
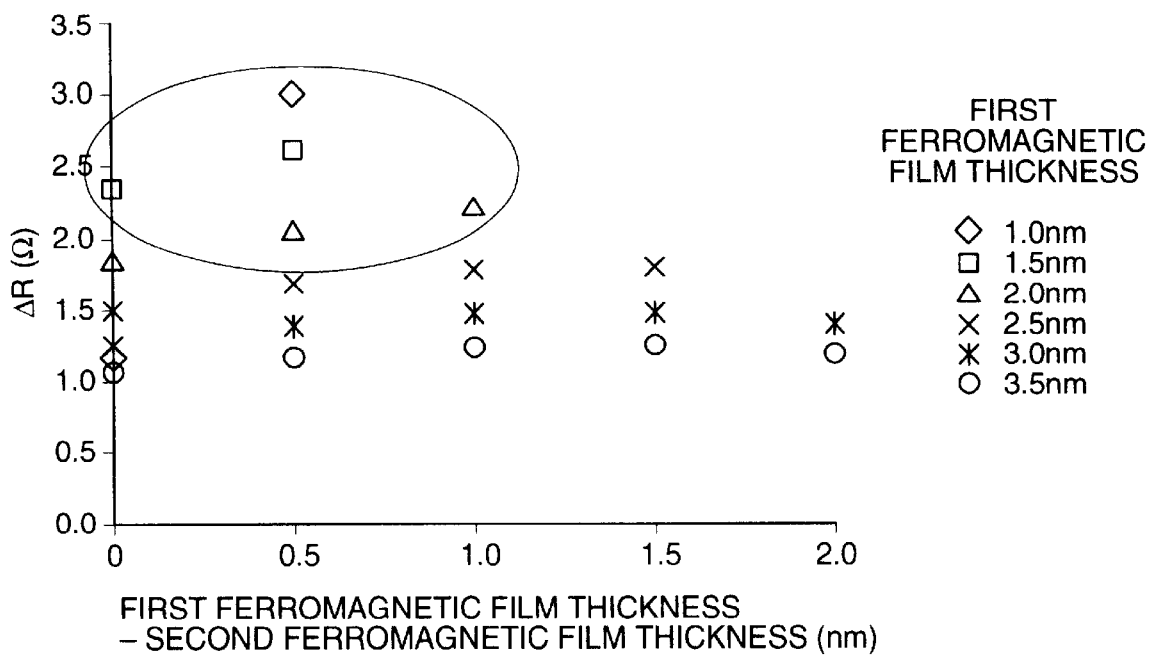
FIG. 5 is a diagram showing the relationship between a value of a first ferromagnetic film thickness minus a second ferromagnetic film thickness and ΔR.
Figure 6:
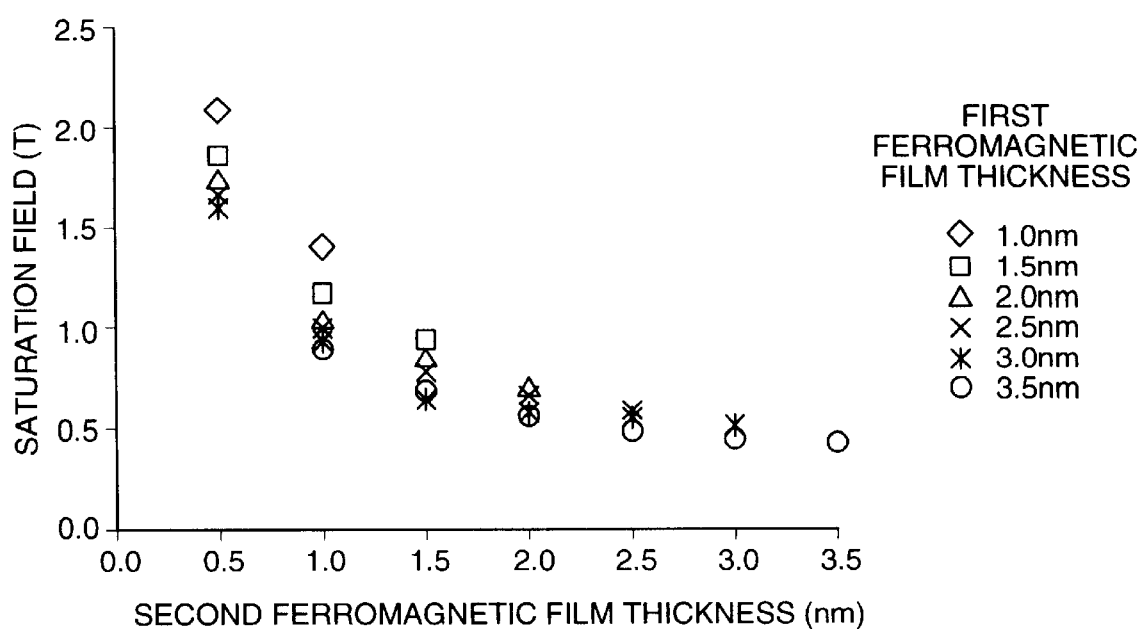
FIG. 6 is a diagram showing the relationship between a film thickness of a giant magnetoresistive laminated film of the present invention and saturation field.

With the above structure in mind, a film thickness of a pinned layer will be set and output thereof will be discussed below. FIG. 3 shows an example of the structure of a giant magnetoresistive laminated film according to this invention. The giant magnetoresistive laminated film comprises a structure consisting of an antiferromagnetic film 11/a first ferromagnetic film 151/an antiparallel coupling layer 150/a second ferromagnetic film 152/an oxide layer 155/a third ferromagnetic film 153/a nonmagnetic intermediate layer 12/a soft-magnetic free layer 13 on a substrate 50. A ferromagnetic pinned layer 15 is of a laminated structure. Also, there is shown an example of a laminated structure, in which the soft-magnetic free layer 13 consists of a first soft-magnetic film 131 and a second soft-magnetic film 132. Similarly, there is shown an example of a laminated structure, in which a protective film 37 consists of Cu and Ta layers. This very thin Ta protective film is naturally oxidized in the atmosphere to become an oxide film. The figure also shows examples of materials and thicknesses for respective layers. The first, second and third ferromagnetic films make magnetic exchange-coupling with one another through the antiparallel coupling layer 150 and the oxide layer 155 to be arranged antiparallel and parallel to one another, as shown in the figure by symbols. The laminated film of the structure shown in FIG. 3 will be described with respect to the property thereof. FIG. 4 is a view showing an example of the relationship between a film thickness and $\Delta R$ of the giant magnetoresistive laminated film according to this invention. This relationship was determined by fixing to 1 nm·T (nanometer·tesla) a substantial amount of magnetization of the pinned layer, i.e., an amount of magnetization of the third ferromagnetic film+an amount of magnetization of the second ferromagnetic film−an amount of magnetization of the first ferromagnetic film. An abscissa represents a thickness t2 of the second ferromagnetic film, and symbols in the figure represent $\Delta R$ when a thickness t1 of the first ferromagnetic film is set to 1.0 nm, 1.5 nm, 2.0 nm, 2.5 nm, 3.0 nm and 3.5 nm. $\Delta R$ varies in value according to the thickness of the second ferromagnetic film and assumes its maximum for a particular thickness. The thickness of the second ferromagnetic film with $\Delta R$ maximum is such that t2=0.5 nm when t1=1.0 nm, t2=1.0 nm when t1=1.5 nm, and t2=1.5 nm when t1=2.0 nm, and it is understood that the thickness of the second ferromagnetic film shifts with the thickness of the first ferromagnetic film. FIG. 5 shows $\Delta R$ with the abscissa representing the thickness difference (t2−t1), i.e., (first ferromagnetic film thickness−second ferromagnetic film thickness). As apparent from figure, $\Delta R$ assumes a good value when the value of (first ferromagnetic film thickness−second ferromagnetic film thickness) is around 0.5 nm, particularly in the range of between 0 nm and 1 nm, and $\Delta R$ is high when the thicknesses of the first and second ferromagnetic films t1, t2 are equal to or less than 2 nm. Likewise, FIG. 6 shows the relationship between the thickness and the saturation field of the giant magnetoresistive laminated film in this invention. It is found that the saturation field exhibits a substantially particular value relative to the second ferromagnetic film thickness, and that a large saturation field, about 2 T, is needed for the thickness where high $\Delta R$ is obtained, for example t1=1.0 nm and t2=0.5 nm.

FIGS. 7A, 7B and 7C show magnetization curves resulted from calculation of the giant magnetoresistive film of the present invention before magnetization. For the purposes of comparison, a magnetization curve for a film, in which (first ferromagnetic film thickness−second ferromagnetic film thickness) is set as large as 2 nm. Calculation was performed with the first ferromagnetic film thickness of 1.5 nm and the second ferromagnetic film thickness of 0.5 nm and with the first ferromagnetic film thickness of 2.5 nm and the second ferromagnetic film thickness of 0.5 nm. In the case of the thickness difference of 1 nm, it is found that from the magnetization curve in high field that the magnetization of the first ferromagnetic film is oriented forward-parallel or antiparallel to the external field in the range of 0.2–0.7 T in magnetic field and in the range of 1.8 T or higher. It is also found in the magnetization curve in the low field that a region is stable where the magnetic field is 0.03 T or lower and magnetization of the first ferromagnetic film is oriented in the direction of the external field. It is found that when the magnetic field in the above ranges is set as a magnetic field for magnetization, magnetization of a laminated film with the first ferromagnetic film thickness of 1.5 nm and the second ferromagnetic film thickness of 0.5 nm can be performed stably. With the structure described above, in which (first ferromagnetic film thickness−second ferromagnetic film thickness) is set to 0.5 nm, there is existent a region where magnetization of the first ferromagnetic film is antiparallel to the external field in the relatively weak magnetic field in the range of around 30 mT, and thus it is found that when heat treatment is carried out in this region of magnetic field, it is possible to carry out stable magnetization or heat treatment in the post-wafer-process even if a large magnetic field as the saturation field is not present. On the other hand, the magnetization curve in the low field in the case of the magnetic film thickness difference being set large does not include the above-mentioned range where the state of magnetization is stable as described above, and so it is found that heat treatment in a weak magnetic field cannot be performed stably in a structure, in which a difference in thickness between the first ferromagnetic film and the second ferromagnetic film is large.

Figure 8A:
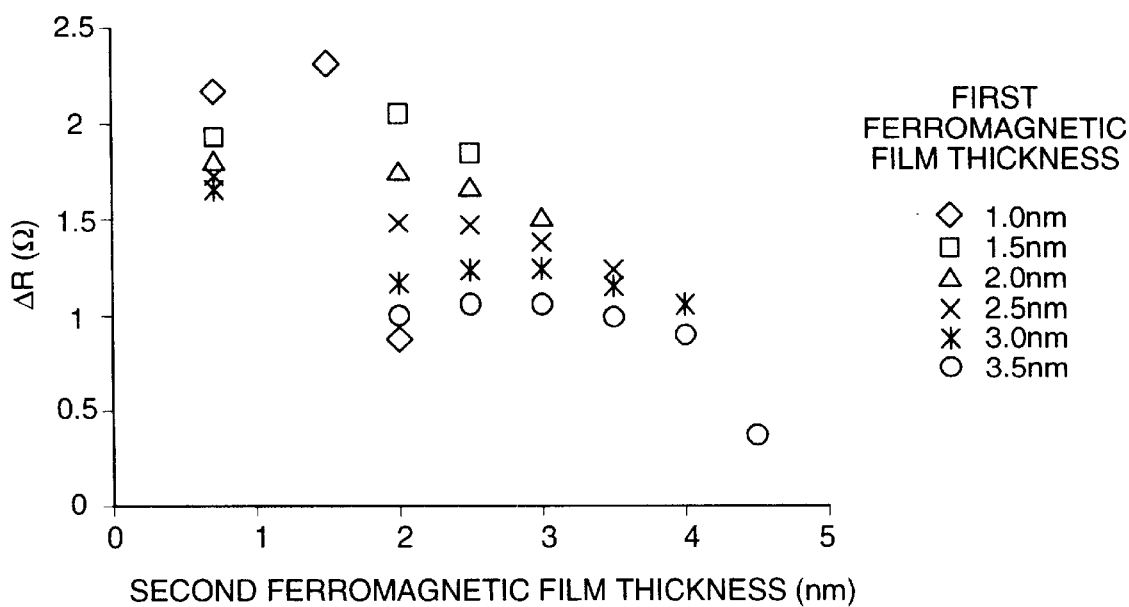
FIGS. 8A and 8B are diagrams showing the relationship between a thickness of a giant magnetoresistive laminated film of this invention and ΔR, with an effective difference of a pinned layer being fixed to 2 nm·T.
Figure 8B:
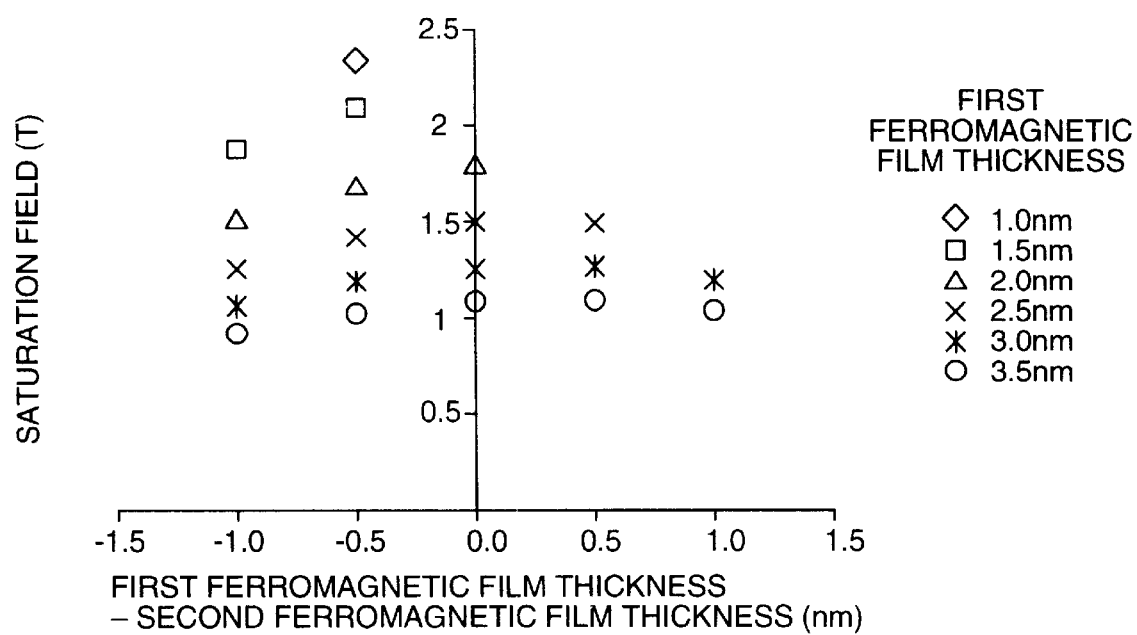

FIGS. 8A and 8B show that relationship between a thickness and ΔR of the giant magnetoresistive laminated film of this invention, which is determined by fixing to 2 nm·T (nanometer·tesla) a substantial difference of the pinned layer, i.e., a value of (an amount of magnetization of the third ferromagnetic film+an amount of magnetization of the second ferromagnetic film−an amount of magnetization of the first ferromagnetic film), in a like structure. Even with the difference in the pinned layer varied, a similar relationship establishes in the thickness of the first ferromagnetic film and the thickness of the second ferromagnetic film, in which ΔR has a peak, and so it is found that high output can be obtained by setting a value of (the first ferromagnetic film thickness–the second ferromagnetic film thickness) to from −1 nm to 0 nm. This is because a difference in the ferromagnetic film thickness in comparison with the results in FIG. 5 results from a difference in the setting of a substantial difference in the pinned layer.

Meanwhile, FIG. 9 shows magnetization curves resulted from calculation of that giant magnetoresistive film of the present invention before magnetization, in which (first ferromagnetic film thickness–second ferromagnetic film thickness) is set to −0.5 nm. Because a value of (first ferromagnetic film thickness–second ferromagnetic film thickness) is negative, a region, in which magnetization of the first ferromagnetic film is oriented antiparallel to the external field, exists stably in a range of relatively weak magnetic field, more specifically a wide range of 0.3 T or less, and so it is found that when heat treatment is carried out in this region of magnetic field, it is possible to carry out stable magnetization or heat treatment in the post-wafer-process even if a large magnetic field as the saturation field is not present.

FIG. 10 shows an amount of magnetization of the pinned layer required for high-density recording. FIG. 10 shows the relationship between an amount of magnetization of the pinned layer and the asymmetry of head output. It is found from the result with current in the read part of the magetic head being 3 mA that an amount of magnetization of 1 nm·T produces a favorable head output with asymmetry being made substantially zero. With the current being made 6 mA, the amount of magnetization is about 2 nm·T to make asymmetry of head output substantially zero.

From the discussion above, it is understood that, to maintain the asymmetry of head output favorable with an amount of current needed for the magnetic head, high ΔR, i.e., high output, and stability in magnetization can be obtained by setting (first ferromagnetic film thickness–second ferromagnetic film thickness) in the range of from −1 nm to 0 nm or from 0 nm to 1 nm. Because a Co alloy thin film having the saturation flux density of about 1.8 T is suitable for the first and second ferromagnetic films, an amount of magnetization is substantially −1.8 nm·T to 1.8 nm·T. It is also found that high output can be obtained when the first and second ferromagnetic films are 2 nm or less in thickness.

Figure 11:
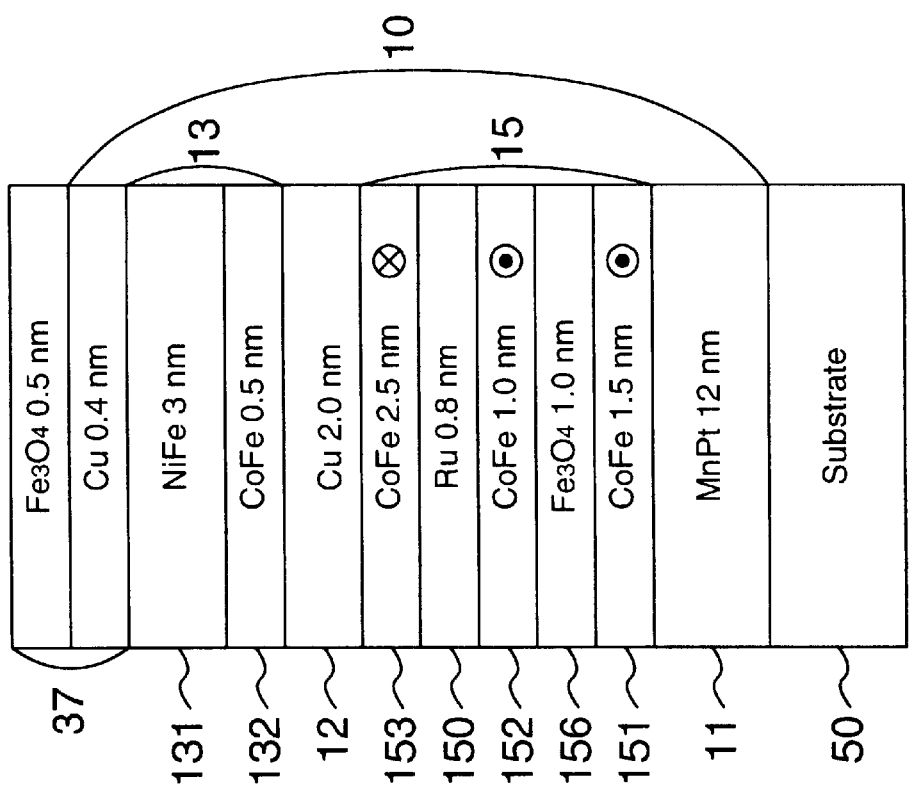
FIG. 11 illustrates a further exemplary construction of a giant magnetoresistive laminated film in the present invention.

FIG. 11 shows another structure of a giant magnetoresistive laminated film of the present invention. The giant magnetoresistive laminated film 10 comprises a laminated structure consisting of an antiferromagnetic film 11/a first ferromagnetic film 151/a magnetization field control layer 156/a second ferromagnetic film 152/an antiparallel coupling layer 150/a third ferromagnetic film 153/a nonmagnetic intermediate layer 12/a soft-magnetic free layer 13 on a substrate 50. Also, the soft-magnetic free layer 13 in this example is composed of a first soft-magnetic film 131 and a second soft-magnetic film 132, which are of laminated structure. Similarly, a protective film 37 in this example is composed of Cu and $Fe_3O_4$ layers, which are of laminated structure. The figure also shows exemplarily materials and thicknesses of the respective layers. The first, second and third ferromagnetic films are of magnetic exchange-coupling structure relative to one another through the antiparallel coupling layer 150 and the magnetization field control layer 156, as shown by symbols in the figure, so as to be arranged antiparallel and parallel to one another. The magnetization field control layer 156 has a function of generating a relatively weak ferromagnetic coupling between the first ferromagnetic film 151 and the second ferromagnetic film 152. Here, the term "relatively weak" means that the coupling magnetic field is weak as compared with the antiferromagnetic coupling that the antiparallel coupling layer 150 generates between the second ferromagnetic film 152 and the third ferromagnetic film 153. When an external field is applied, the first ferromagnetic film 151 saturates toward the external field in a smaller field than that, in which the antiferromagnetic coupling between the second ferromagnetic film 152 and the third ferromagnetic film 153 saturates, and thus the magnetization field control layer 156 can be applied to reduce the magnetization field.

Figure 12:
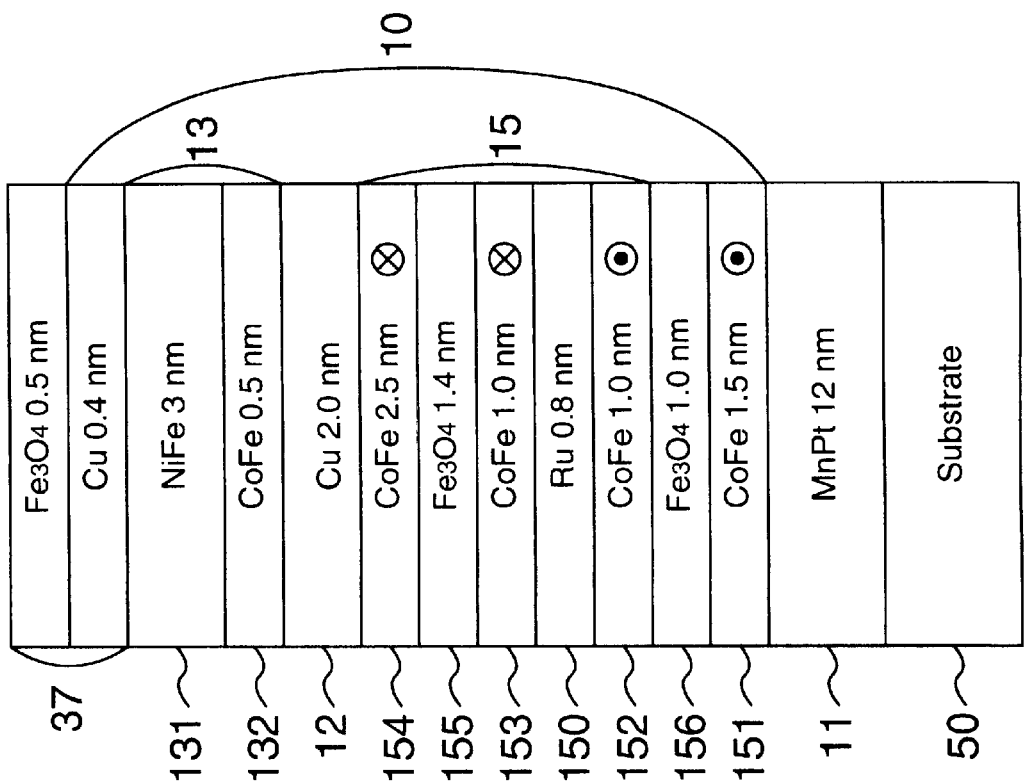
FIG. 12 illustrates a still further exemplary construction of a giant magnetoresistive laminated film in the present invention.

Likewise, FIG. 12 shows still another structure of a giant magnetoresistive laminated film of the present invention. The giant magnetoresistive laminated film 10 comprises a laminated structure consisting of an antiferromagnetic film 11/a first ferromagnetic film 151/a magnetization field control layer 156/a second ferromagnetic film 152/an antiparallel coupling layer 150/a third ferromagnetic film 153/an oxide layer 155/a fourth ferromagnetic film 154/a nonmagnetic intermediate layer 12/a soft-magnetic free layer 13. The ferromagnetic pinned layer 15 is of laminated structure. The soft-magnetic free layer 13 in this example is of laminated structure to be composed of a first soft-magnetic film 131 and a second soft-magnetic film 132. Similarly, a protective film 37 in this example is of laminated structure of Cu and $Fe_3O_4$ layers. The figure also shows exemplarily materials and thicknesses of the respective layers. The first, second, third and fourth ferromagnetic films are of magnetic exchange-coupling structure relative to one another through the antiparallel coupling layer 150, the oxide layer 155 and the magnetization field control layer 156, as shown by symbols in the figure, so as to be arranged antiparallel and parallel to one another. The magnetization field control layer 156 has a function of generating a relatively weak ferromagnetic coupling between the first ferromagnetic film 151 and the second ferromagnetic film 152. Here, the term "relatively weak" means that the coupling magnetic field is weak as compared with the antiferromagnetic coupling that the antiparallel coupling layer 150 generates between the second ferromagnetic film 152 and the third ferromagnetic film 153. When an external field is applied, the first ferromagnetic film 151 saturates toward the external field in a smaller field than that, in which the antiferromagnetic coupling between the second ferromagnetic film 152 and the third ferromagnetic film 153 saturates, and thus the magnetization field control layer 156 can be applied to reduce the magnetization field. The oxide layer 155 improves the quality of the fourth ferromagnetic film, promotes a recrystallization process due to heat treatment, and creates specular reflections of electrons to improve the giant magnetoresistance.

The film structure and magnetization processing therefor according to the present invention will be described more concretely for each of embodiments.

Embodiment 1]

Figure 13A:
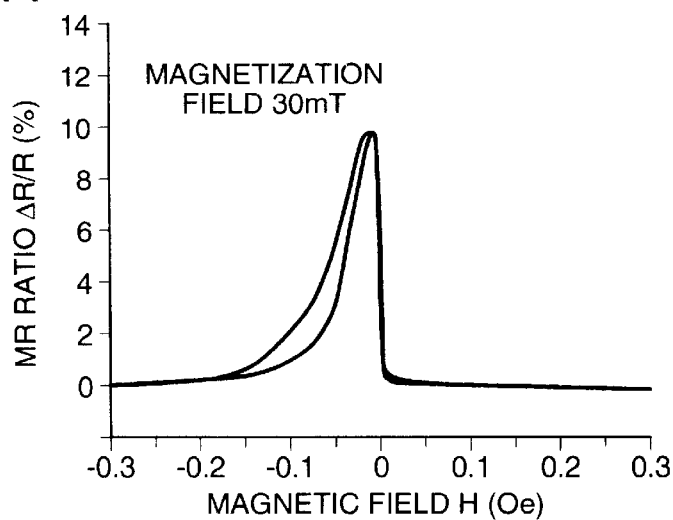
FIGS. 13A, 13B and 13C are diagrams showing magnetoresistance curves when a giant magnetoresistive laminated film of the invention is varied in magnetization field.
Figure 13B:
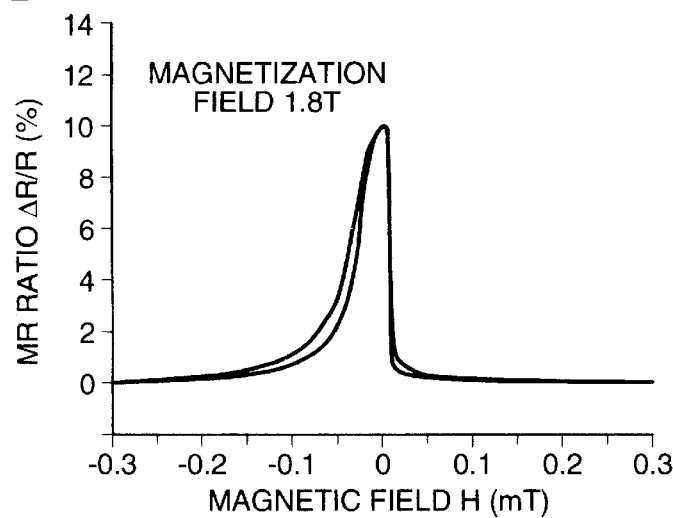
Figure 13C:
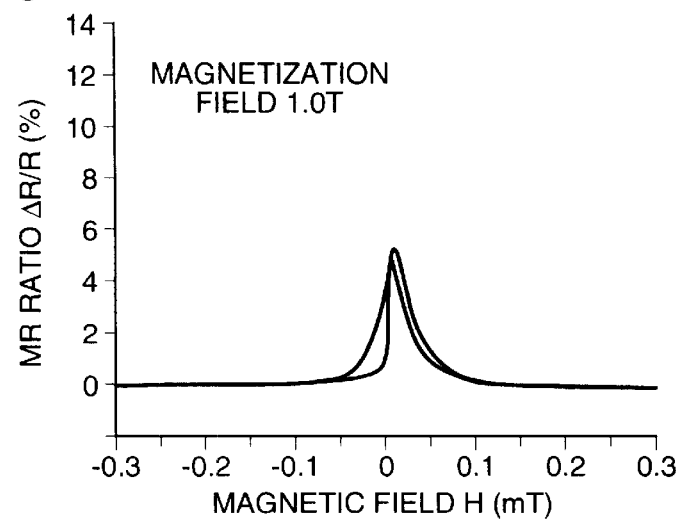
Figure 14:
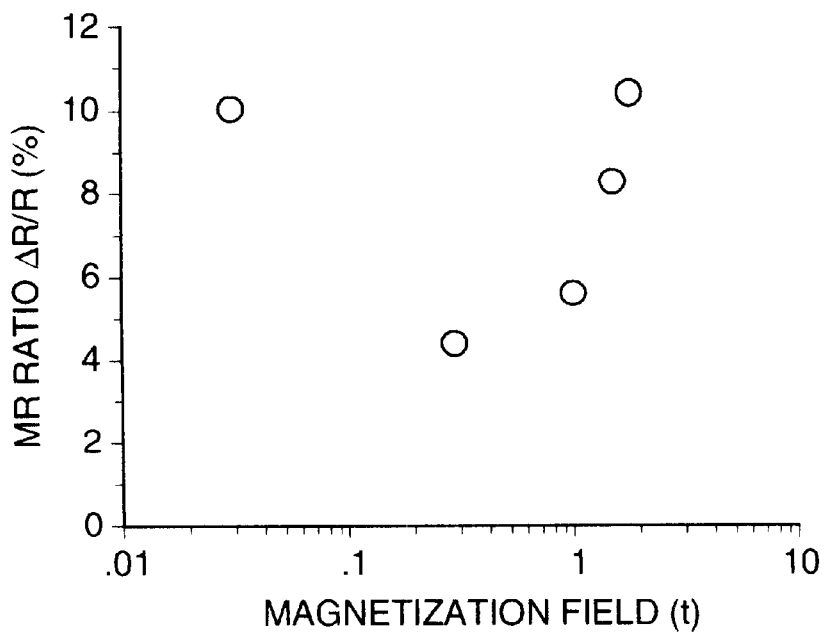
FIG. 14 is a diagram showing the relationship between the magnetization field of a giant magnetoresistive laminated film of the invention and an MR ratio.

FIGS. 13A, 13B and 13C show magnetoresistance curves for a film of a structure of a substrate/MnPt 12 nm/CoFe 1.5 nm/Ru 0.8 nm/CoFe 0.5 nm/$Fe_3O_4$-x 1.4 nm/CoFe 2 nm/Cu 2.1 nm/CoFe 0.5 nm/NiFe 3 nm/Cu 0.4 nm/Ta 1 nm with magnetization fields varied. Magnetoresistance curves with magnetization fields being 30 mT and 1.8 T exhibit a favorable property and are high in MR ratio. On the other hand, it is seen that a magnetoresistance curve with magnetization field being 1 T is abnormal in shape, low in MR ratio and unfavorable in conduction of the pinning bias in a predetermined direction by magnetization. FIG. 14 shows the relationship between the magnetization field and the MR ratio for t1=1.5 nm and t2=0.5 nm. It is seen that for t1=1.5 nm and t2=0.5 nm, the magnetization field is favorable to be in the vicinity of 0.03 T and 1.8 T.

Embodiment 2

Figure 15:
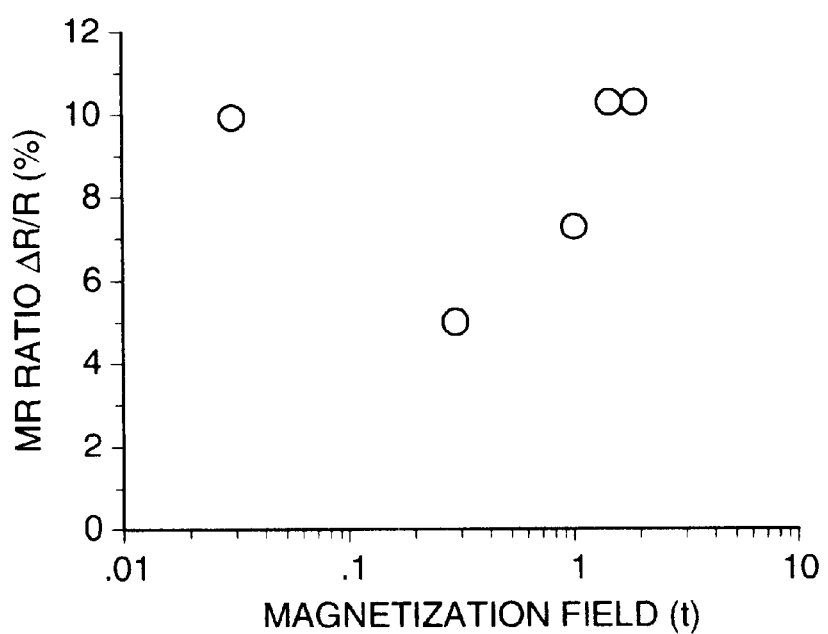
FIG. 15 is a diagram showing the relationship between the magnetization field of a giant magnetoresistive laminated film of another construction of the invention and an MR ratio.

FIG. 15 shows the relationship between the magnetization field and the MR ratio for a film of a structure of a substrate/MnPt 12 nm/CoFe 1.5 nm/Ru 0.8 nm/CoFe 1 nm/$Fe_3O_4$-x 1.4 nm/CoFe 2.5 nm/Cu 2.1 nm/CoFe 0.5 nm/NiFe 3 nm/Cu 0.4 nm/Ta 1 nm. It is seen that with magnetization field being 0.03 T and 1.5 T or higher, a high MR ratio and a good property are obtained.

Embodiment 3

Figure 16:
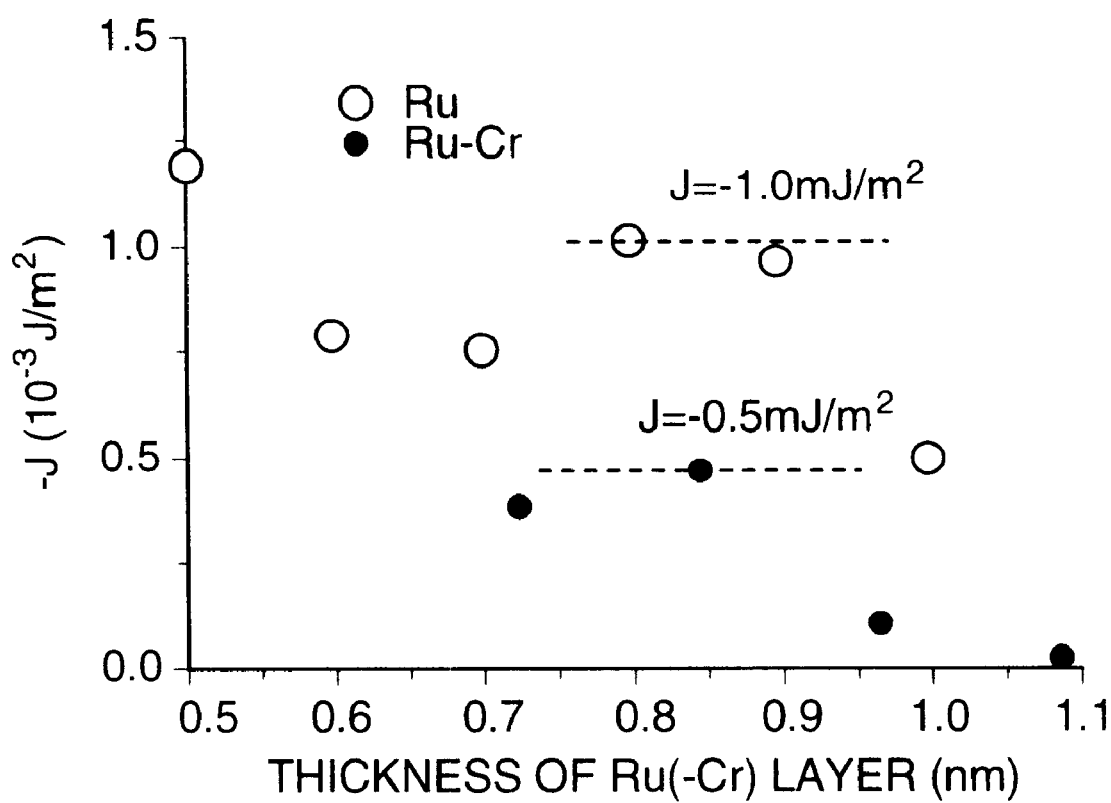
FIG. 16 is a diagram showing antiferromagnetic exchange coupling energies of Ru and Ru—Cr antiparallel coupling layers.

FIG. 16 shows antiferromagnetic coupling energies of Ru and Ru—Cr antiparallel coupling layers. When Ru is used for an antiparallel coupling layer, the exchange coupling energy J is −1.0 mj/m² with Ru of 0.8 nm but is approximately half with Ru in the case of a Ru—Cr antiparallel coupling layer with Cr added to Ru. In this manner, the application of the Ru—Cr antiparallel coupling layer can reduce the saturation magnetization field of the giant magnetoresistive laminated film of this invention by half. Also, by adding appropriate additives such as Pt, Cu, Au, Ag, Pd, Ni, Co, Fe, and Cr, the antiferromagnetic exchange coupling energy J of Ru, Os, Ir, Re and Rh can be controlled to appropriately adjust the saturation field.

Embodiment 4

Figure 17:
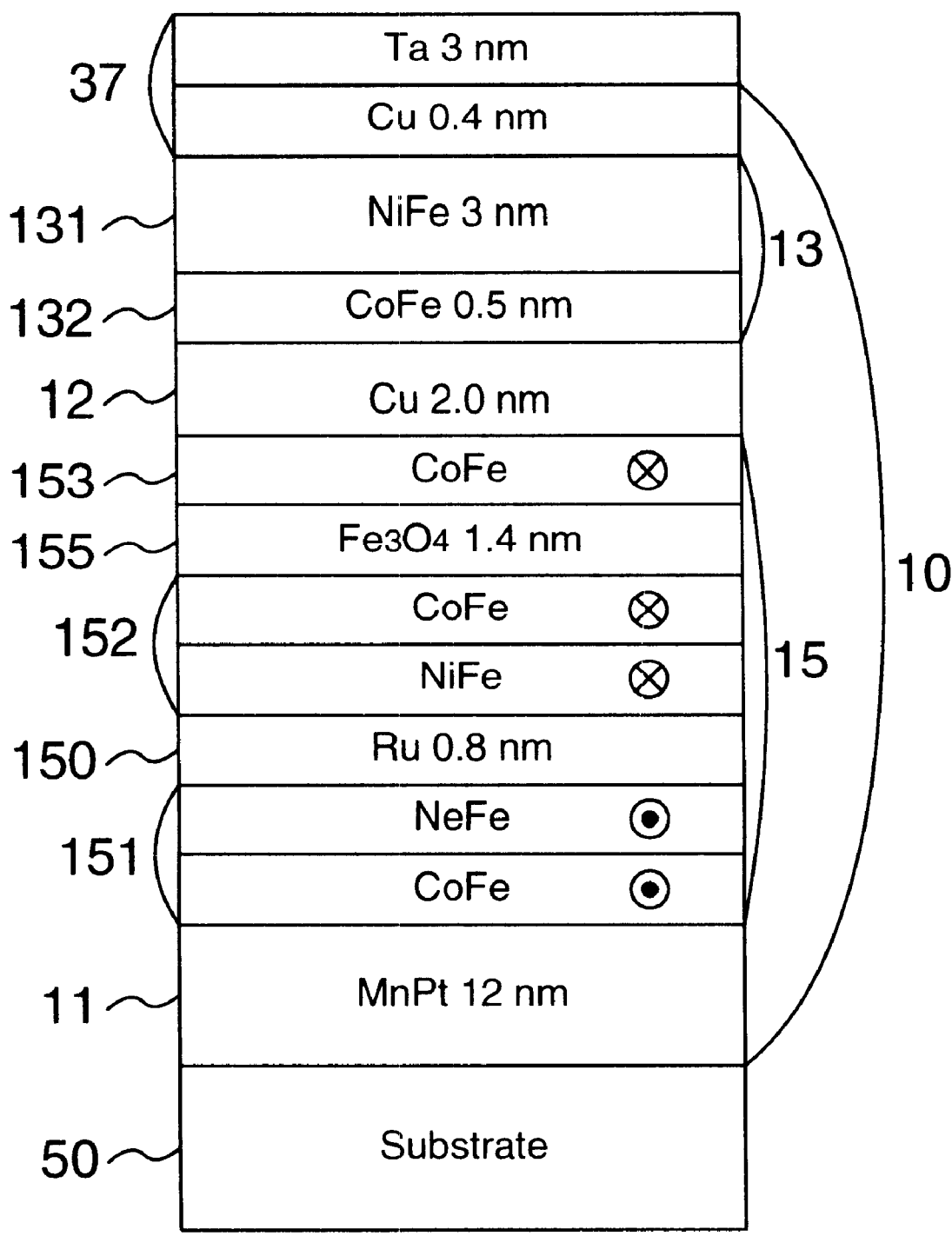
FIG. 17 illustrates an exemplary construction of a giant magnetoresistive laminated film of the present invention with a NiFe film laminated over a ferromagnetic film.

FIG. 17 shows an exemplary structure of a giant magnetoresistive laminated film of this invention. The laminated film is a structure consisting of an antiferromagnetic film/a first ferromagnetic film/an antiparallel coupling layer/a second ferromagnetic film/an oxide layer/a third ferromagnetic film/a nonmagnetic intermediate layer/a soft-magnetic free layer, the first and second ferromagnetic films each being of lamination comprising a CoFe film and a NiFe film, and the NiFe film being in contact with the antiparallel coupling layer. With this structure, the exchange coupling energy that the antiparallel coupling layer produces in the first and second ferromagnetic films can be reduced to −0.3 J/m², approximately one fourth the conventional value obtained when only the CoFe film was used. Because the saturation field can be thus reduced, heat treatment with a magnetization field of 1 T could be used to provide for a favorable property on the magnetization field, which was poor in the case of only the CoFe film.

Embodiment 5

Figure 18:
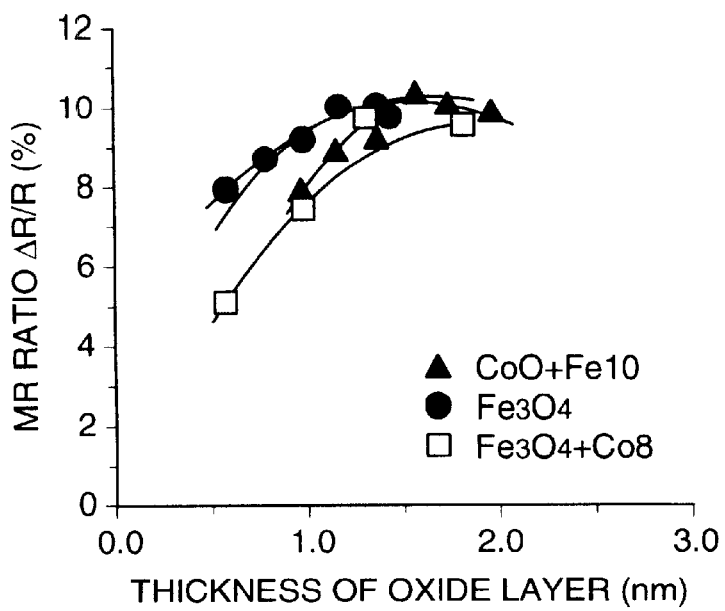
FIG. 18 is a diagram showing the relationship between thickness and property of an oxide layer in a giant magnetoresistive laminated film of the invention, in which a (Co—Fe)O film and $Fe_3O_4$ film are used as oxide films.
Figure 19:
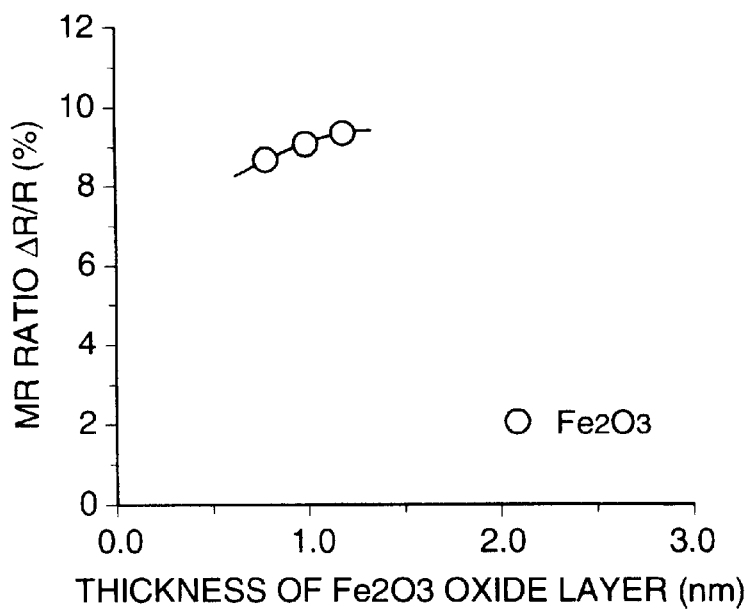
FIG. 19 is a diagram showing the relationship between thickness and property of an oxide layer in a giant magnetoresistive laminated film of the invention, in which a $Fe_2O_3$ film is used as an oxide film.
Figure 20:
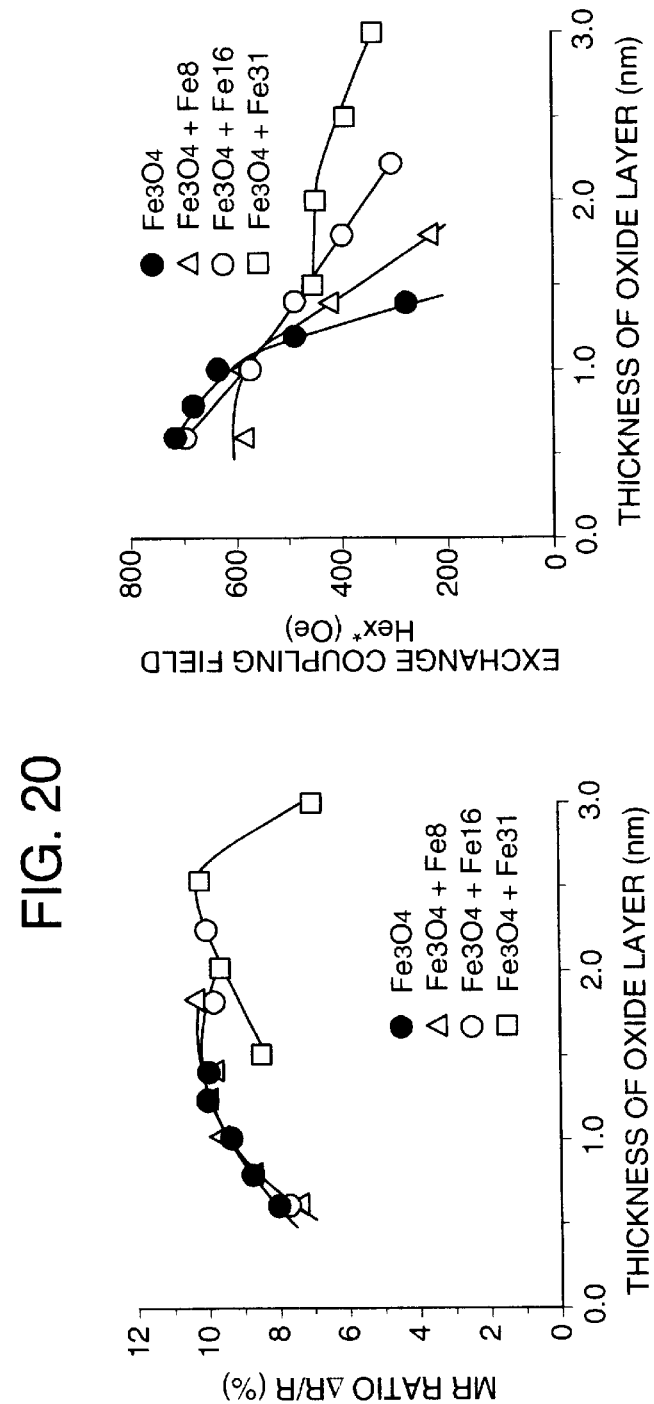
FIG. 20 is a diagram showing the thickness and property of an oxide layer in a giant magnetoresistive laminated film of the invention when Fe is added to a $Fe_3O_4$ film.
Figure 21:
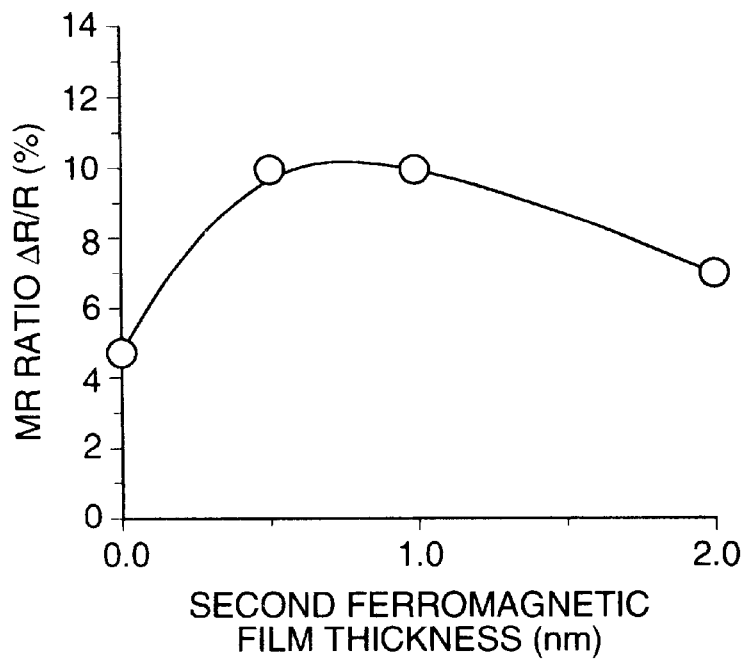
FIG. 21 is a diagram showing the relationship between the thickness of a second ferromagnetic film and the MR ratio of a giant magnetoresistive laminated film of the invention.

An oxide target was used to form an oxide layer. FIG. 18 shows thicknesses and properties of various oxide layers in a giant magnetoresistive laminated film of the present invention. Likewise, FIG. 19 shows the property of a giant magnetoresistive laminated film of the invention making use of a $Fe_2O_3$ film. FIG. 19 shows results with a CoFe single layer used as a soft-magnetic free layer and also shows results with a thin CoFe film used as a protective film. The CoFe film is naturally oxidized in the atmosphere to make an oxide film. There are shown data in the case of a (Co—Fe)O film, a $Fe_3O_4$ film and a $Fe_2O_3$ film being used as oxide films, and it is seen that insertion of oxide layers causes an increase in MR ratio as compared with the case without oxide layers, and thus is effective in an increase in output. MR ratio peaks relative to the thickness of oxide layers when the layers have an appropriate thickness in the range of about 1 nm to 1.5 nm. FIG. 20 shows thicknesses and properties of oxide layers in a giant magnetoresistive laminated film of this invention, in which Fe is added to a $Fe_3O_4$ film. Analysis of oxygen content in an oxide is difficult to perform, and thus the number of 1-cm-square Fe chips arranged is indicated as a measure of an amount of addition. While MR ratio peaks relative to the thickness of oxide layers when the layers have a particular thickness in the range of about 1 nm to 2 nm, it is seen that the more the amount of Fe added the more the thickness. When a large amount of Fe is added, the thickness of the oxide layer exceeds 2 nm and reaches as large as 2.5 nm. Also, it is seen that the addition of Fe increases the apparent exchange coupling field, i.e., in a magnetoresistance curve of a giant magnetoresistive laminated film a value of external field, at which the MR ratio becomes one-half a peak value as a result of the magnetization of a pinned layer being changed by the external field. This indicates that the ferromagnetic films are ferromagnetically coupled to each other through the oxide layer and the coupling strength is regulated by the composition and thickness of the oxide layer. What is observed as the apparent exchange coupling field is believed to be mainly such ferromagnetic coupling. FIG. 21 shows the relationship between the thickness of the second ferromagnetic film and the MR ratio of the giant magnetoresistive laminated film of this invention. Even when the thickness of the second ferromagnetic film is as thin as 0.5 nm, the MR ratio can be maintained high. It has been confirmed from measurement results of magnetization of this film that the sum of magnetization of the first, second and third ferromagnetic films is substantially in accordance with the design of film thickness. It has been found that an interface free of significant scattering or mixing is formed at the boundary between an oxide layer and a ferromagnetic film, and the design of magnetization of ferromagnetic films, which is important in the manufacture of a magnetic head, can be correctly made.

Embodiment 6

Figure 22A:
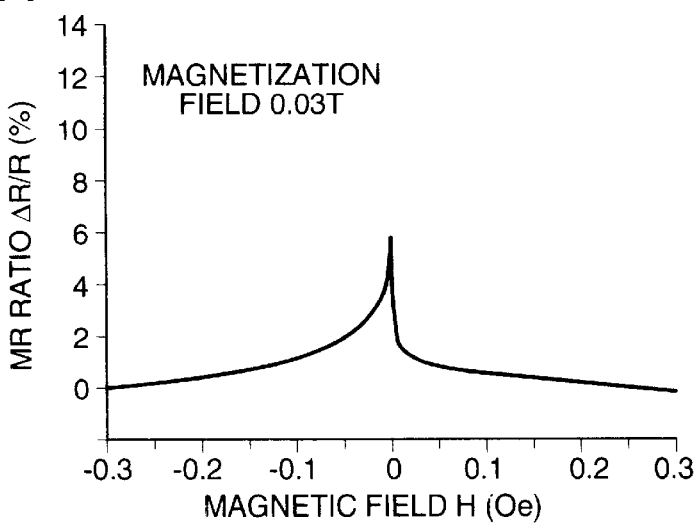
FIGS. 22A, 22B and 22C are diagrams showing the relationships between magnetization field of a giant magnetoresistive laminated film using a magnetization field control layer of the invention and magnetoresistance curves.
Figure 22B:
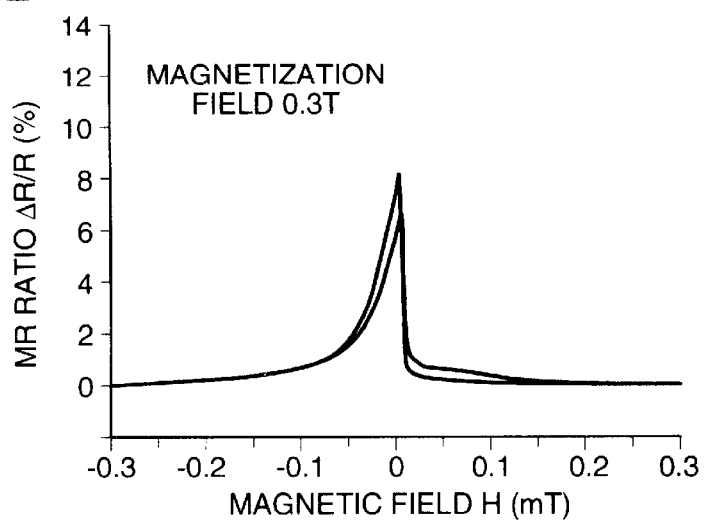
Figure 22C:
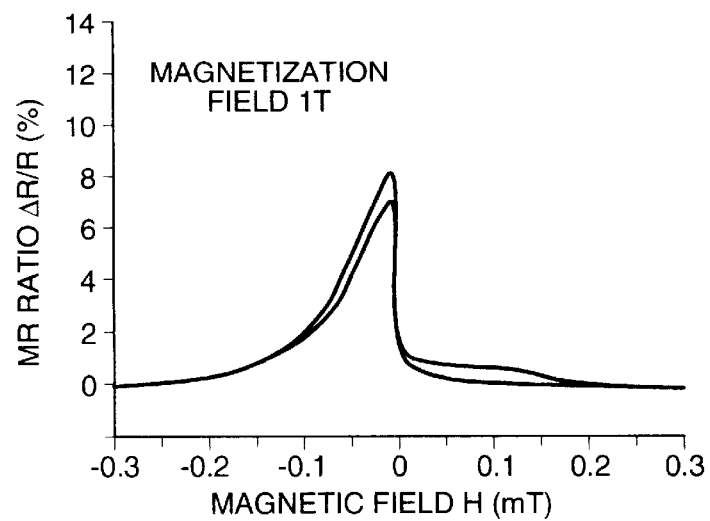

FIGS. 22A, 22B and 22C show the relationship between a magnetization field and a magnetoresistance curve of a giant magnetoresistive laminated film, which makes use of a magnetization field control layer of this invention. The giant magnetoresistive laminated film is a structure consisting of an antiferromagnetic film/a first ferromagnetic film/a magnetization field control layer/a second ferromagnetic film/an antiparallel coupling layer/a third ferromagnetic film/a nonmagnetic intermediate layer/a soft-magnetic free layer. It is understood that a magnetoresistance curve becomes poor in a magnetization field of 30 mT and the pinning bias is not induced in a predetermined direction, but that normal magnetoresistance curves are observed in a magnetization field of 0.3 T or higher, and the pinning bias can be set normally by the introduction of the magnetization field control layer. In a like manner, a favorable magnetoresistance was shown by a giant magnetoresistive laminated film, which uses a magnetization field control layer and an oxide layer of this invention and was fabricated in a magnetization field of 0.3 T and which is a structure consisting of an antiferromagnetic film/a first ferromagnetic film/a magnetization field control layer/a second ferromagnetic film/an antiparallel coupling layer/a third ferromagnetic film/an oxide layer/a fourth ferromagnetic film/a nonmagnetic intermediate layer/a soft-magnetic free layer.

Embodiment 7

Figure 23:
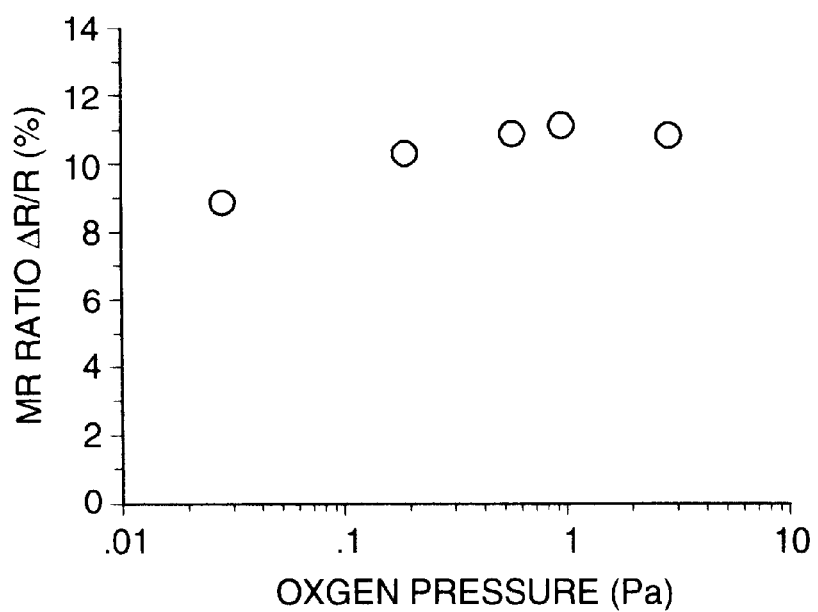
FIG. 23 is a diagram showing the relationship between an oxygen pressure and an MR ratio when an oxide layer of a giant magnetoresistive laminated film of the invention is formed under exposure to an oxygen atmosphere.

FIG. 23 shows the relationship between an oxygen pressure and the MR ratio of a giant magnetoresistive laminated film of this invention when the oxide layer is formed in exposure to an oxygen atmosphere. The exposure duration was 30 second. A favorable characteristic was obtained in a magnetization field of 1.5 T. Rise of the oxygen pressure to around 1 pascal resulted in enhancement of about 11% in MR ratio. At this time, it was found that magnetization of the laminated film was decreased by an amount corresponding to about 0.7 nm due to oxidation, and measurement with respect to X-ray reflectivity revealed formation of an oxide layer of about 2 nm.

Now, the magnetic head of this invention will be described in detail.

FIG. 24 shows an exemplary structure of a giant magnetoresistive magnetic head, which makes use of the giant magnetoresistive laminated film of this invention. The figure is a schematic view as viewed from a surface opposing a magnetic medium. Formed on the substrate 50 are a lower magnetic shield 35 and a lower gap film 71, on which is formed a giant magnetoresistive laminated film 10. Further, an upper gap film 72 and an upper magnetic shield 36 are formed to define a read gap 43, by which a read signal is detected. An electrode 40 is placed in contact with the giant magnetoresistive laminated film 10 to perform application of sensor current and detect changes in electric resistance. A magnetic domain control film 41 is formed from a hard magnetic film or a magnetic film with remanent magnetization, and is arranged adjacent to the giant magnetoresistive laminated film 10 to function to produce on the giant magnetoresistive laminated film 10 a bias effect for single domain magnetization. While the method of forming the electrodes 40 and the magnetic domain control films 41 and their configurations are described here in the case of a so-called hard bias structure, various other methods can be adopted. In the example shown in FIG. 24, the giant magnetoresistive laminated film 10 is of a structure comprising a base film 14, an antiferromagnetic film 11, a ferromagnetic pinned layer 15, a nonmagnetic conductive layer 12, a soft-magnetic free layer 13, and a protective film 37, all of which are formed successively. The soft-magnetic free layer 13 is shown in FIG. 22 as having a laminate of the first soft-magnetic film 131 and the second soft-magnetic film 132, but it may be formed from a single magnetic layer or a laminate consisting of three layers without departing from the spirit of this invention. Alternatively, the soft-magnetic free layer may contain an oxide or consist of a laminate of oxide layers without departing from the spirit of this invention. Similarly, a structure containing a magnetostriction control layer as well as the protective film 37 may be adopted without departing from the spirit of this invention. As shown by arrows in the figure, the magnitude of magnetic anisotropy is set so that a direction of magnetization of the soft-magnetic free layer 13 corresponds to substantially a widthwise direction of tracks in a state, in which a magnetic field to be sensed is zero. In the exemplary structure of FIG. 24, the most important feature of this invention resides in the structure of the ferromagnetic pinned layer 15 in the manner described above. The ferromagnetic pinned layer 15 in FIG. 24 comprises a first ferromagnetic film 151 in contact with the antiferromagnetic film 11, a third ferromagnetic film 153 in contact with the nonmagnetic conductive layer 12, a second ferromagnetic film 152 stacked between the first and third ferromagnetic films, an antiparallel coupling layer 150 for performing antiparall exchange-coupling of magnetization of the first ferromagnetic film and the second ferromagnetic film, and an oxide layer 155 for generating a ferromagnetic coupling between the second ferromagnetic film and the third ferromagnetic film and enhancing the magnetoresistance.

Figure 25:
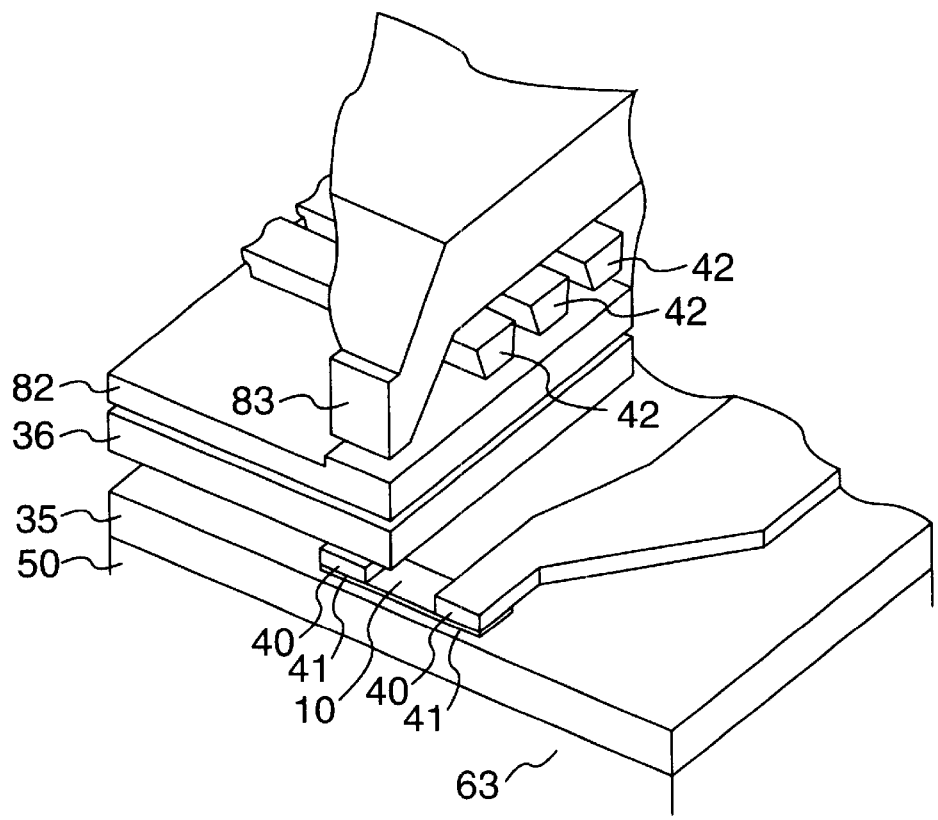
FIG. 25 is a conceptional illustration of a magnetic head mounting thereon a magnetic sensor composed of a magnetoresistive element of the invention.

FIG. 25 is a conceptual illustration of a magnetic head mounting thereon a magnetic sensor made from a magnetoresistance element of the present invention. Formed on the substrate 50 are a giant magnetoresistive laminated film 10, a magnetic domain control film 41, electrodes 40, a lower shield 35, an upper shield 36, a lower magnetic core 82, coils 42, and an upper magnetic core 83, all of which define an opposing face 63. In this figure, the upper magnetic shield 36 and a lower magnetic core 82 are formed, but a structure, in which the upper shield serves as the lower shield, is within the spirit of the invention.

Figure 26:
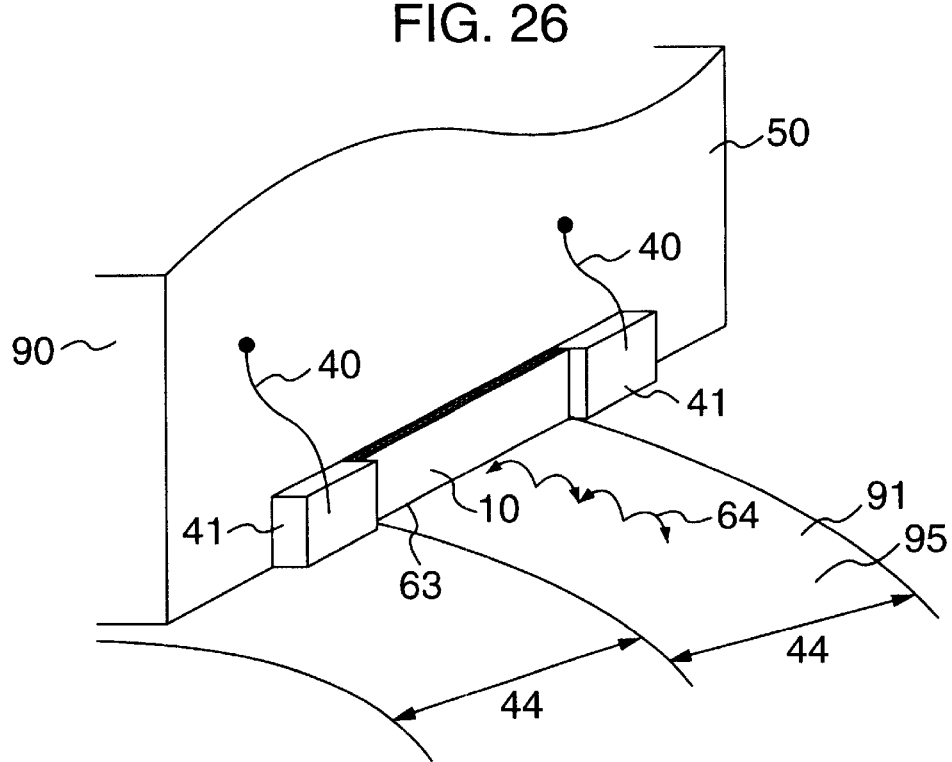
FIG. 26 is a conceptional illustration of a magnetic recording/reproducing apparatus using a magnetic head of the invention.

FIG. 26 is a conceptual illustration of a magnetic recording/reproducing apparatus using the magnetic head of this invention. Formed on the substrate 50 serving as a head slider 90 are the giant magnetoresistive laminated film 10, the magnetic domain control films 41 and the electrodes 40, which form a magnetic head. The magnetic head thus formed is positioned on a recording track 44 of a disk 95 having a recording medium 91 to read data. It is desired that the read part is arranged in the read gap formed of magnetic films, which is not shown in the figure. The head slider 90 floats several tens of nanometers or less above the disk 95 with its opposing face 63 facing the disk or moves in sliding contact with and relative to the disk. With this mechanism, the magnetoresistive laminated film 10 can read a magnetic signal recorded in the recording medium 91 on the disk 95 through a leakage field 64 of the recording medium 91.

Figure 27:
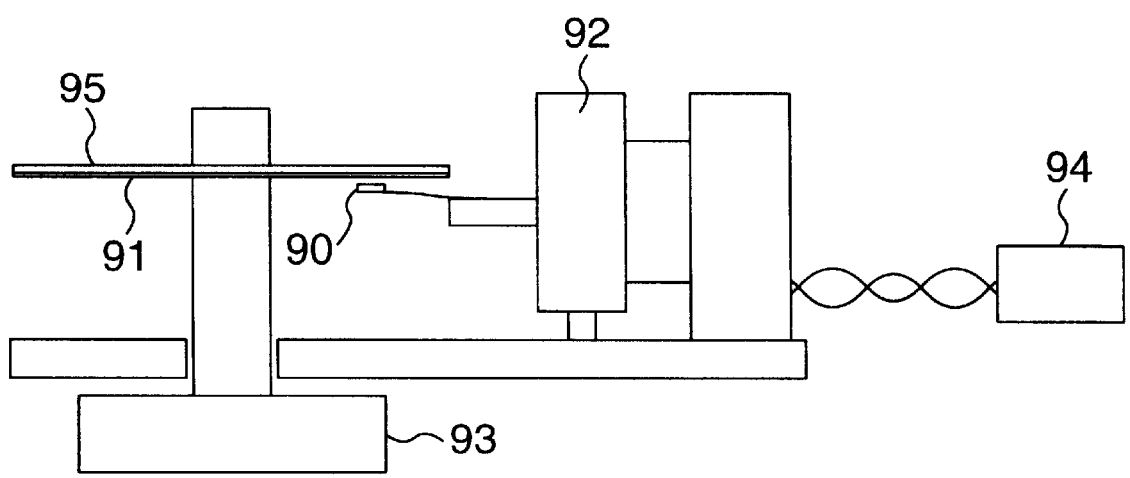
FIG. 27 illustrates an exemplary construction of a magnetic recording/reproducing apparatus of the invention.

FIG. 27 shows an exemplary construction of the magnetic recording/reproducing apparatus of this invention. A disk 95 holding a recording medium 91 containing magnetically recorded information is rotated by a spindle motor 93, and a head slider 90 is moved over tracks of the disk 95 by an actuator 92. That is, in a magnetic disk drive, the read head and write head formed on the head slider 90 are caused by the mechanism close to relatively move close to a predetermined recording position on the disk 95 to successively write or read signals. It is desired that the actuator 92 be a rotary actuator. A recording head causes a record signal to be recorded on the medium through a signal processing system 94, and an output of the read head is picked up through the signal processing system 94 to provide a signal. When the read head is to be moved onto a desired recording track, a highly sensitive output from the read head can be used to detect its position on the track, control the actuator and position the head slider. While this figure shows one head slider 90 and one disk 95, they may be plural. Further, the disk 95 may have recording media 91 on both sides to record information. When information is recorded on both sides of the disk, the head sliders 90 are arranged on both sides of the disk.

The construction described above was examined by using the magnetic head of this invention and the magnetic recording/reproducing apparatus mounting thereon the magnetic head with the result that satisfactory outputs and favorable bias properties were shown and reliability in operation was also favorable.

As described above, according to the present invention, a magnetic sensor with high output and favorable bias properties can be manufactured at low cost by a method of stable magnetization and manufacture. Further, a magnetic head using such magnetic sensor is obtained, and it is possible to provide a magnetic head having favorable and stable read output and bias property particularly in high recording density, and a high-density magnetic recording/reproducing apparatus.

The present invention includes the following embodiments set forth in numbered paragraphs describing the embodiments.

1. A method of manufacturing the magnetic head of the invention including:
   performing a heat treatment by holding the magnetic head in a temperature range of between 200( C. and 350( C. in a vacuum or an inert gas and in a magnetic field of 0.5 T or lower.
2. A method of manufacturing the magnetic head of the invention including:
   performing a heat treatment by holding the magnetic head in a temperature range of between 200( C. and 350( C. in a vacuum or an inert gas and in a magnetic field of 1 T or higher for a predetermined time and then cooling the magnetic head down to 100( C. or below in the magnetic field.
3. A magnetic head comprising a laminated film, the laminated film having:
   a first ferromagnetic film applied with a bias field from an antiferromagnetic film;
   a second ferromagnetic film ferromagnetically coupled with the first ferromagnetic film through an intermediate layer;
   a third ferromagnetic film antiferromagnetically coupled with the second ferromagnetic film through a metal intermediate layer; and
   a soft-magnetic film magnetically isolated by a nonmagnetic intermediate layer and having its magnetization direction changed according to an external field;
   wherein a magnetoresistance of the laminated film changes according to the external field and a change in the magnetoresistance is detected by supplying a current in a direction perpendicular to a layer stacking direction of the laminated film.
4. A magnetic head according to embodiment 3, wherein the laminated film has a fourth ferromagnetic film ferromagnetically coupled with the third ferromagnetic film through an oxide layer.
5. A magnetic head according to embodiment 3 or 4, wherein the oxide layer is an oxide of Co, Fe, Ni, Mn or Cr, or an oxide of a mixture of these and has a thickness of between 0.4 nm and 3 nm.
6. A magnetic head according to embodiment 3 or 5, wherein the oxide layer has a composition of $Fe_3O_4$-x and has a thickness of between 0.4 nm and 3 nm.
7. A magnetic head according to embodiment 3 or 6, wherein the intermediate layer is an oxide of Co, Fe, Ni, Mn or Cr, or an oxide of a mixture of these and has a thickness of between 0.4 nm and 3 nm.
8. A magnetic head according to embodiment 3 or 6, wherein the intermediate layer has a composition of $Fe_3O_4$-x and has a thickness of between 0.4 nm and 3 nm.
9. A magnetic head according to embodiment 3 or 8, wherein the metal intermediate layer is a metal film made from at least one element selected from a first group of Cu, Ru, Pd, Pt, Au and Ag, an alloy film including at least one element selected from the first group, or an alloy film including at least one element each from a second group of Ni, Co and Fe and from the first group.
10. A method of manufacturing the magnetic head of the invention, wherein the oxide layer is formed by a vacuum thin film deposition technique, such as sputtering, using an oxide target.
11. A method of manufacturing a magnetic head according to embodiment 10, wherein the oxide layer is formed by depositing a metal thin layer and exposing the metal thin layer to an oxygen atmosphere to oxidize it.
12. A method of manufacturing a magnetic head according to embodiment 10, wherein the oxide layer is formed by depositing a metal thin layer and exposing the metal thin layer to an oxygen atmosphere to oxidize it.

What is claimed is:

1. A magnetic head comprising a laminated film, which comprises:
   a first ferromagnetic film applied with a bias field from an antiferromagnetic film;
   a second ferromagnetic film antiferromagnetically coupled with the first ferromagnetic film through a metal intermediate layer;
   a third ferromagnetic film ferromagnetically coupled with the second ferromagnetic film through an oxide layer; and
   a soft-magnetic film, which is magnetically isolated by a nonmagnetic intermediate layer and of which direction of magnetization varies according to an external field; and
   wherein the laminated film varies in magnetoresistance in response to the external field and a current in a direction perpendicular to a lamination direction of the laminated film change is supplied to detect a change in magnetoresistance,
   wherein a Ni alloy layer is formed on at least a part of interfaces of the first and second ferromagnetic films, which interfaces contact with the metal intermediate layer.

2. A magnetic head comprising a laminated film, which comprises:
   a first ferromagnetic film applied with a bias field from an antiferromagnetic film;
   a second ferromagnetic film antiferromagnetically coupled with the first ferromagnetic film through a metal intermediate layer;
   a third ferromagnetic film ferromagnetically coupled with the second ferromagnetic film through an oxide layer; and
   a soft-magnetic film, which is magnetically isolated by a nonmagnetic intermediate layer and of which direction of magnetization varies according to an external field; and
   wherein the laminated film varies in magnetoresistance in response to the external field and a current in a direction perpendicular to a lamination direction of the laminated film change is supplied to detect a change in magnetoresistance,
   wherein the metal intermediate layer is an alloy layer, in which 1 to 50 atomic % of at least one selected from the second group of Pt, Cu, Au, Ag, Pd, Ni, Co, Fe and Cr is mixed with at least one selected from the first group of Ru, Os, Ir, Re and Rh.

3. A magnetic head comprising a laminated film having an antiferromagnetic film, a ferromagnetic pinned layer formed on the antiferromagnetic film, a nonmagnetic intermediate layer formed on the ferromagnetic pinned layer, and a soft-magnetic free layer formed on the nonmagnetic intermediate layer; and a pair of electrodes formed at two ends of the laminated film;

wherein magnetization of the soft-magnetic free layer rotates in response to an external field, and a relative angle between magnetization of the soft-magnetic free layer and magnetization of the ferromagnetic pinned layer changes to the laminated film to produce a magnetoresistance; and the ferromagnetic pinned layer comprises:

a first ferromagnetic film exchange-coupled with the antiferromagnetic film to be magnetized and pinned in one direction substantially parallel to the external field;

a third ferromagnetic film in contact with the nonmagnetic intermediate layer;

a second ferromagnetic film formed between the first and third ferromagnetic films;

a metal intermediate layer antiferromagnetically coupling magnetization of the first ferromagnetic film and magnetization of the second ferromagnetic film to each other; and an oxide layer producing a relatively weak ferromagnetic coupling between the second and third ferromagnetic films;

wherein a Ni alloy layer is formed on at least a part of interfaces of the first and second ferromagnetic films, which interfaces contact with the metal intermediate layer.

4. A magnetic head comprising a laminated film having an antiferromagnetic film, a ferromagnetic pinned layer formed on the antiferromagnetic film, a nonmagnetic intermediate layer formed on the ferromagnetic pinned layer, and a soft-magnetic free layer formed on the nonmagnetic intermediate layer; and a pair of electrodes formed at two ends of the laminated film;

wherein magnetization of the soft-magnetic free layer rotates in response to an external field, and a relative angle between magnetization of the soft-magnetic free layer and magnetization of the ferromagnetic pinned layer changes to the laminated film to produce a magnetoresistance; and the ferromagnetic pinned layer comprises:

a first ferromagnetic film exchange-coupled with the antiferromagnetic film to be magnetized and pinned in one direction substantially parallel to the external field;

a third ferromagnetic film in contact with the nonmagnetic intermediate layer;

a second ferromagnetic film formed between the first and third ferromagnetic films;

a metal intermediate layer antiferromagnetically coupling magnetization of the first ferromagnetic film and magnetization of the second ferromagnetic film to each other; and an oxide layer producing a relatively weak ferromagnetic coupling between the second and third ferromagnetic films;

wherein the metal intermediate layer is an alloy layer, in which 1 to 50 atomic % of at least one selected from the second group of Pt, Cu, Au, Ag, Pd, Ni, Co, Fe and Cr is mixed with at least one selected from the first group of Ru, Os, Ir, Re and Rh.

* * * * *